United States Patent
Hosokawa et al.

(10) Patent No.: US 6,347,189 B1
(45) Date of Patent: Feb. 12, 2002

(54) FLASH CONTROLLER OF A CAMERA

(75) Inventors: Tetsuo Hosokawa; Toshihiro Hamamura, both of Tokyo; Shigeru Iwamoto, Saitama, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/598,447

(22) Filed: Jun. 22, 2000

(30) Foreign Application Priority Data

Jun. 28, 1999 (JP) .......................................... 11-181555

(51) Int. Cl.$^7$ ........................ G03B 15/02; G03B 15/03; G03B 17/18
(52) U.S. Cl. .......................... 396/62; 396/178; 396/202
(58) Field of Search ............................ 396/61, 62, 176, 396/177, 178, 155, 201, 202, 205, 206, 529

(56) References Cited

U.S. PATENT DOCUMENTS 5,086,315 A * 2/1992 Nishida et al. ............. 396/177
5,175,581 A 12/1992 Nishida et al. ............. 396/176
6,067,422 A * 5/2000 Tokunaga et al. ........... 396/157

FOREIGN PATENT DOCUMENTS

JP          59 111133          6/1984

* cited by examiner

Primary Examiner—David M. Gray
Assistant Examiner—Rochelle Blackman
(74) Attorney, Agent, or Firm—Greenblum & Bernstein P.L.C.

(57) ABSTRACT

A flash controller of a camera system includes a camera body and an interchangeable lens which is detachably attached to the camera body, the camera body including a built-in flash, the interchangeable lens being of a type which can have data communication with the camera body to output lens data on the interchangeable lens to the camera body. The flash controller includes a memory which is provided in the camera body in which data on the built-in flash are pre-stored; and a calculating device, provided in the camera body, for judging whether flashlight emitted from the built-in flash will be interrupted by a periphery of the interchangeable lens in accordance with the lens data input from the interchangeable lens and flash data input from the built-in flash.

28 Claims, 16 Drawing Sheets

FLASH CONTROLLER OF A CAMERA

BACKGROUND OF THE INVENTION

1. Field of the Invention

The present invention relates to a flash controller of a camera system which includes a camera body and an interchangeable lens which is detachably attached to the camera body.

2. Description of the Related Art

In cameras having a built-in flash, specifically, in SLR cameras having a built-in flash to which an interchangeable lens is detachably attached, there is a possibility that the flashlight emitted from the built-in flash will be interrupted by the periphery of the attached interchangeable lens, so that the flashlight does not cover the center lower part of the object area, resulting in casting a shadow of the attached lens thereon. Specifically, if the attached lens is an extremely-wide-angle lens, the flashlight will not cover the periphery of the object area because the angle of view of the lens is generally greater than the flash coverage (cover angle of view) of the built-in flash, so that the flashlight will not reach the periphery of the object area, thus resulting in a lack of the quantity of light thereof. On the other hand, if the object distance is too short, the quantity of the flashlight is not properly controlled, which may result in an over exposure. Conversely, if the object distance is too long, a sufficient quantity of the flashlight will not be given to the object area, which may result in an under exposure. In these cases, if the flash emits automatically at a time of exposure, an undesired exposure will be obtained.

SUMMARY OF THE INVENTION

An object of the present invention is to provide a flash controller of a camera system including a camera body and an interchangeable lens which is detachably attached to the camera body, which makes it possible to reduce the number of undesired exposures in the photography using flash.

To achieve the object mentioned above, according to an aspect of the present invention, a flash controller of a camera system is provided, including a camera body and an interchangeable lens which is detachably attached to the camera body, the camera body including a built-in flash, the interchangeable lens being of a type which can have data communication with the camera body to output lens data on the interchangeable lens to the camera body. The flash controller includes a memory which is provided in the camera body in which data on the built-in flash are pre-stored; and a calculating device, provided in the camera body, for judging whether flashlight emitted from the built-in flash will be interrupted by a periphery of the interchangeable lens in accordance with the lens data input from the interchangeable lens and flash data input from the built-in flash. According to this structure, it can be judged whether the flashlight emitted from the built-in flash will be interrupted by the periphery of the attached interchangeable lens in accordance with the input lens information. Therefore, if it is judged that the flashlight emitted from the built-in flash will be interrupted by the periphery of the attached interchangeable lens, the flashlight can be prevented from casting a shadow of the attached interchangeable lens on the center lower part of the object area by prohibiting the built-in flash from discharging at a time of exposure.

In an embodiment, the calculating device calculates a flash interruption value which represents quantity of light emitted from the built-in flash which is interrupted by the periphery of the interchangeable lens, and subsequently judges whether the flashlight will be interrupted by the periphery of the interchangeable lens in accordance with the calculated flash interruption value.

Preferably, an auto-flash prohibiting device is further provided, which prohibits the flash from automatically discharging if the calculating device judges that the flashlight will be interrupted by the periphery of the interchangeable lens.

In an embodiment, the camera body includes a multi-segment photometering device for determining whether an object to be photographed is in a backlit situation, the camera body providing an auto flash discharge mode, wherein the flash can discharge automatically at a time of exposure in the backlit condition. The calculating device judges whether the flashlight will be interrupted by the periphery of the interchangeable lens on condition that an object distance is longer than a predetermined distance and that a selected shutter speed is slower than the slowest shutter speed calculated to prevent blurred images which may be caused by hand movement of the camera body.

Preferably, the object distance is obtained via the data communication.

In an embodiment, the flash controller prohibits the flash from discharging in the case where the calculating device judges that an object distance is shorter than the predetermined distance and that the selected shutter speed is faster than the slowest shutter speed.

According to another aspect of the present invention, a flash controller of a camera body is provided, to which an interchangeable lens is detachably attached, the camera body including a built-in flash, the interchangeable lens being of a type which can have data communication with the camera body to output lens data on the interchangeable lens to the camera body. The flash controller includes a memory in which data on the built-in flash are pre-stored; and a calculating device for judging whether flashlight emitted from the built-in flash will be interrupted by a periphery of the interchangeable lens in accordance with the lens data input from the interchangeable lens and flash data input from the built-in flash.

In an embodiment, the calculating device calculates a flash interruption value which represents quantity of light emitted from the built-in flash which is interrupted by the periphery of the interchangeable lens, and subsequently judges whether the flashlight will be interrupted by the periphery of the interchangeable lens in accordance with the calculated flash interruption value.

Preferably, an auto-flash prohibiting device is further provided, which prohibits the flash from automatically discharging if the calculating device judges that the flashlight will be interrupted by the periphery of the interchangeable lens.

According to another aspect of the present invention, a flash controller of a camera system is provided, including a camera body, an interchangeable lens which is detachably attached to the camera body, and an external flash which is detachably attached to the camera body, the interchangeable lens being of a type which can have data communication with the camera body to output lens data on the interchangeable lens to the camera body, the external flash being of a type which can have data communication with the camera body to output flash data on the external flash to the camera body. The flash controller includes a calculating device, provided in the camera body, for judging whether flashlight emitted from the external flash will be interrupted by a periphery of the interchangeable lens in accordance with the lens data input from the interchangeable lens and flash data input from the external flash. According to this structure, it can also be judged whether the flashlight emitted from an external flash connected to the camera body will be interrupted by the periphery of the attached interchangeable lens in accordance with the input lens information if the flash information on the external flash can be input to the calculation device.

In an embodiment, the calculating device calculates a flash interruption value which represents quantity of light emitted from the external flash which is interrupted by the periphery of the interchangeable lens, and subsequently judges whether the flashlight will be interrupted by the periphery of the interchangeable lens in accordance with the calculated flash interruption value.

Preferably, an auto-flash prohibiting device which prohibits the flash from automatically discharging if the calculating device judges that the flashlight will be interrupted by the periphery of the interchangeable lens.

In an embodiment, the camera body includes a multi-segment photometering device for determining whether an object to be photographed is in a backlit situation, the camera body providing an auto flash discharge, wherein the flash can discharge automatically at a time of exposure in the backlit condition. The calculating device judges whether the flashlight will be interrupted by the periphery of the interchangeable lens on condition that an object distance is longer than a predetermined distance and that a selected shutter speed is slower than the slowest shutter speed calculated to prevent blurred images which may be caused by hand movement of the camera body.

Preferably, the object distance is obtained via the data communication.

In an embodiment, the flash controller prohibits the flash from discharging in the case where the calculating device judges that an object distance is shorter than the predetermined distance and that the selected shutter speed is faster than the slowest shutter speed.

According to another aspect of the present invention, a flash controller of a camera body is provided, to which each of an interchangeable lens and an external flash is detachably attached, the interchangeable lens being of a type which can have data communication with the camera body to output lens data on the interchangeable lens to the camera body, the external flash being of a type which can have data communication with the camera body to output flash data on the external flash to the camera body. The flash controller includes a calculating device for judging whether flashlight emitted from the external flash will be interrupted by a periphery of the interchangeable lens in accordance with the lens data input from the interchangeable lens and flash data input from the external flash.

Preferably, the calculating device calculates a flash interruption value which represents quantity of light emitted from the external flash which is interrupted by the periphery of the interchangeable lens, and subsequently judges whether the flashlight will be interrupted by the periphery of the interchangeable lens in accordance with the calculated flash interruption value.

Preferably, an auto-flash prohibiting device which prohibits the flash from automatically discharging if the calculating device judges that the flashlight will be interrupted by the periphery of the interchangeable lens.

According to another aspect of the present invention, a flash controller of a camera system is provided, including a camera body and an interchangeable lens which is detachably attached to the camera body, the camera body including a built-in flash, the interchangeable lens being of a type which can have data communication with the camera body to output lens data on the interchangeable lens to the camera body, the camera body being of a type wherein an external flash capable of having data communication with the camera body can be interconnected thereto, to output flash data on the external flash to the camera body. The flash controller includes a memory which is provided in the camera body and in which data on the built-in flash are pre-stored; and a calculating device, provided in the camera body, for judging whether flashlight emitted from the built-in flash will be interrupted by a periphery of the interchangeable lens in accordance with the lens data input from the interchangeable lens and flash data input from the built-in flash, and for judging whether flashlight emitted from the external flash will be interrupted by the periphery of the interchangeable lens in accordance with the lens data input from the interchangeable lens and flash data input from the external flash in the case where the camera body is used with the external flash.

Preferably, an auto-flash prohibiting device is further provided, which prohibits the flash from automatically discharging if the calculating device judges that the flashlight will be interrupted by the periphery of the interchangeable lens.

Preferably, the auto-flash prohibiting device is provided in the camera body.

In an embodiment, the flash controller includes a forced flash discharge device. In the case where a forced discharge mode is selected when the calculating device judges that the flashlight will not be interrupted by the periphery of the interchangeable lens, the forced flash discharge device forcibly activates the flash to discharge at a time of exposure. In the case where the forced discharge mode is selected when the calculating device judges that the flashlight will be interrupted by the periphery of the interchangeable lens, the auto-flash prohibiting device prohibits the flash from discharging. According to the structure, a desired flash control is possible if the auto-flash prohibiting device prohibits the flash from discharging even though the auto-flash prohibiting device judges that the flashlight emitted from the flash will be interrupted by the periphery of the attached interchangeable lens.

The present disclosure relates to subject matter contained in Japanese Patent Application No.11-181555 (filed on Jun. 28, 1999) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1A:
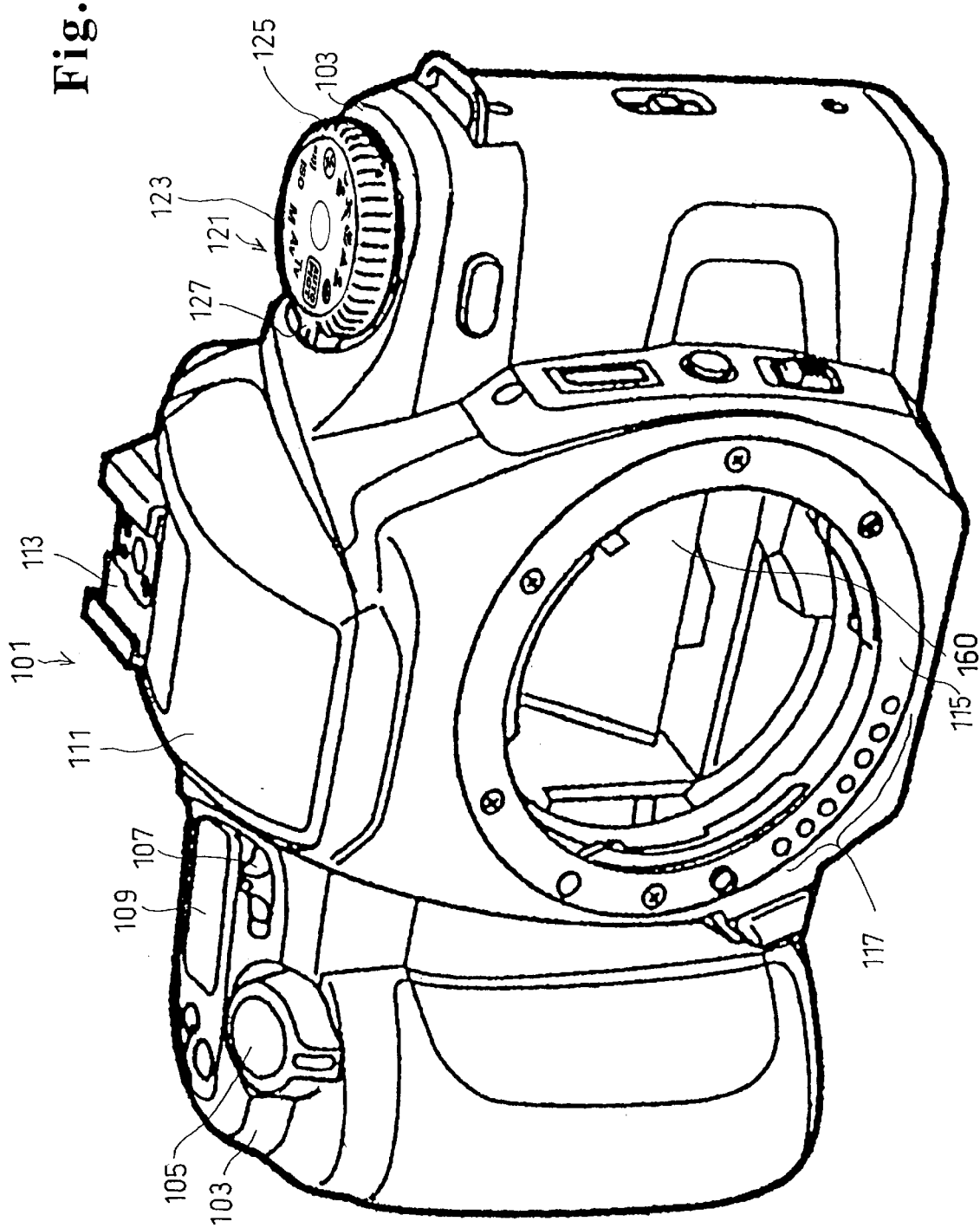
FIG. 1A is a perspective view of an embodiment of a camera body of an SLR camera system, according to the present invention.

FIG. 1 shows an embodiment of a camera body of an AE/AF SLR camera system to which the present invention is applied. The camera body 101 is provided on a top cover 103 thereof with a release button 105, which is positioned on the left side of the top cover 103 as viewed in FIG. 1. The camera body 101 is provided on the top cover 103 behind the release button 105 with a main switch knob 107 and an external LCD panel 109. The external LCD panel 109 indicates various photographic information such as frame number, shutter speed, aperture value and other information. The camera body 101 is provided on the top center thereof with a retractable built-in auto flash 111 which is controlled by a CPU (controller) 11 of the camera body 101 via a built-in flash control circuit 53 (see FIG. 3). The camera body 101 is provided thereon immediately behind the built-in flash 111 with a hot shoe 113 to which an external flash can be coupled. Although the details are not herein discussed, the built-in flash 111 is provided therein with a flashlight unit including a reflector, a xenon tube (flashlight emitter) and a Fresnel lens. The flashlight unit is supported and driven by a pop-up mechanism so that the unit can move between a retracted position (shown in FIG. 1) and a pop-up position (discharge position) where the Fresnel lens faces the object. The pop-up mechanism is provided with a spring which continuously biases the built-in flash 111 towards the pop-up position and a hold mechanism for holding the built-in flash 111 at the retracted position against the spring force of the aforementioned spring when the built-in flash 111 is retracted.

Figure 1B:
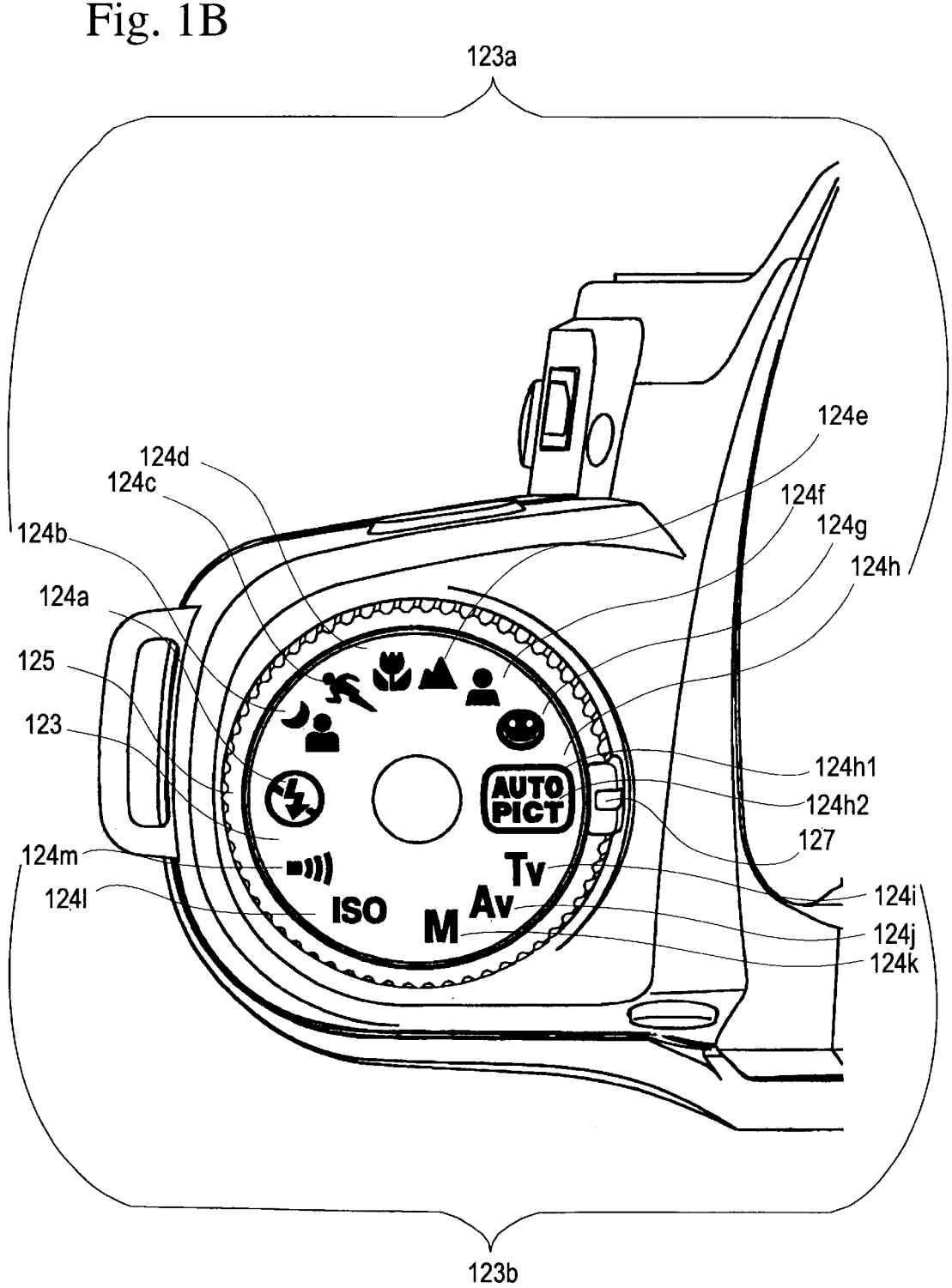
FIG. 1B is a plan view of fundamental elements of the mode dial provided on the camera body shown in FIG. 1A.

The camera body 101 is provided, on the top cover 103 on the right side thereof as viewed in FIGS. 1A and 1B, with a mode dial 121 adapted as a device for manually selecting a desired mode from different modes. The camera body 101 is provided on a front face thereof with an annular body mount 115 to which an interchangeable lens 61 (see FIG. 3) is detachably attached. The camera body 101 is provided on the body mount 115 with an array of contacts 117 which come into contact with a corresponding array of contacts provided on the interchangeable lens 61 so that the CPU 11 can communicate with a lens CPU 63 (see FIG. 3) to input various lens information such as open aperture value and focal length to the CPU 11.

The mode dial 121 is provided with a mode indication disk (indication member) 123 fixed to the top cover 103 and a bezel 125 rotatably fitted around the mode indication disk 123. The mode indication disk 123 is provided thereon circumferentially about a central axis thereof with a plurality of characters (thirteen characters 124a through 124m in this particular embodiment) each representing a corresponding mode. Namely, there are thirteen modes which can be selected by operating the mode dial 121. The bezel 125 is provided with an index mark 127. After the bezel 125 is rotated manually, it always stops by a click-stop mechanism so that the index mark 127 is set to one of the plurality of characters 124a through 124m. When the index mark 127 is set to one of the thirteen characters 124a through 124m, the corresponding one of the thirteen modes is selected.

The thirteen characters 124a through 124m are classified into two groups: the first group 123a including eight characters 124a through 124h and the second group 123b including the remaining five characters 124i through 124m (see FIG. 1B). Portions of the mode indication disk 123 which respectively correspond to the first group of characters 123a are designed to be translucent so that each character in the first group 123a can be illuminated by a corresponding light emitter from the bottom (behind) of the mode indication disk 123 (i.e., from the inside of the camera body 101). None of the characters in the second group 123b are illuminated by a light emitter.

Figure 2:
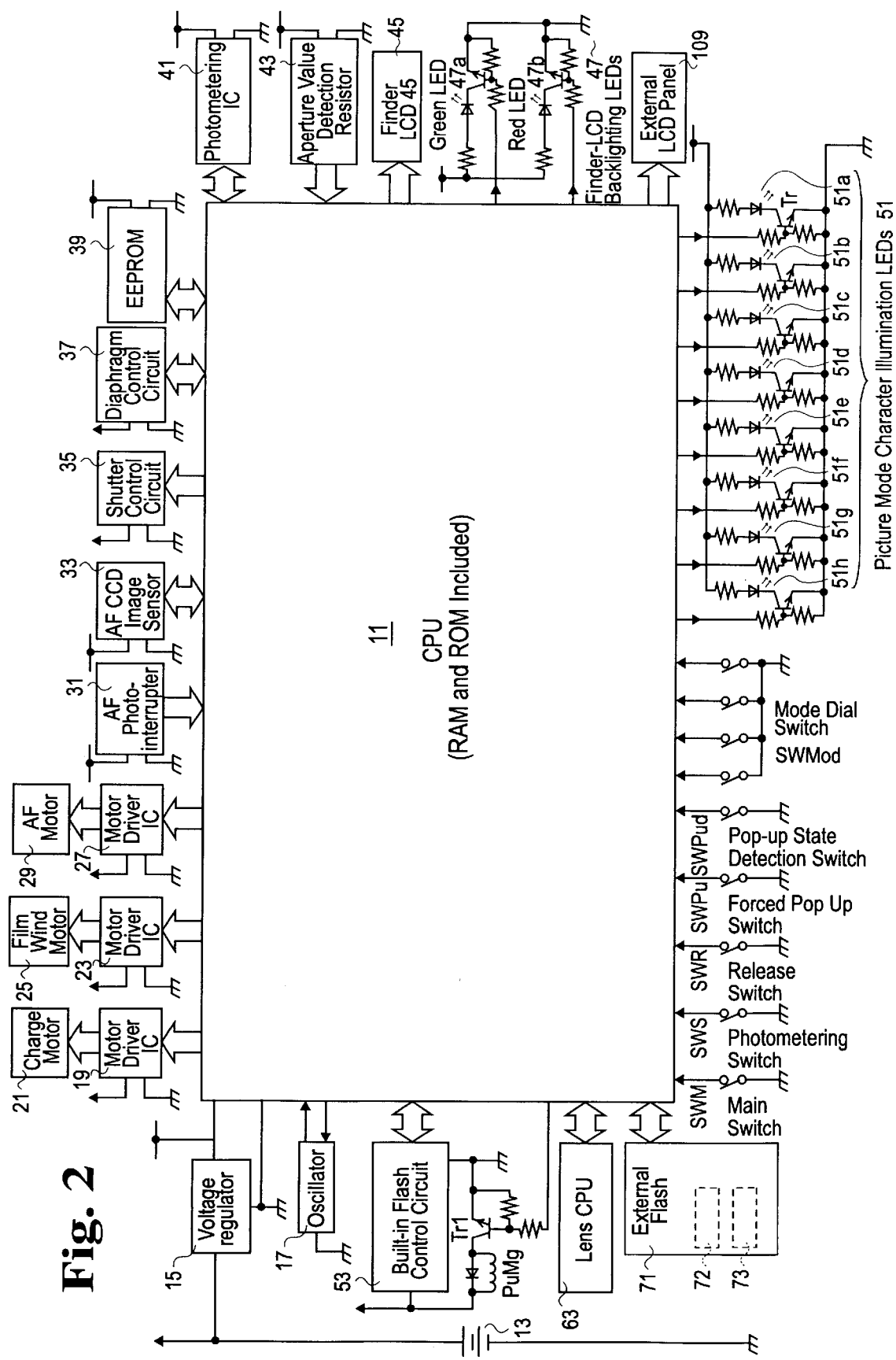
FIG. 2 is a block diagram of an embodiment of a control circuit of the camera body shown in FIG. 1.
Figure 3:
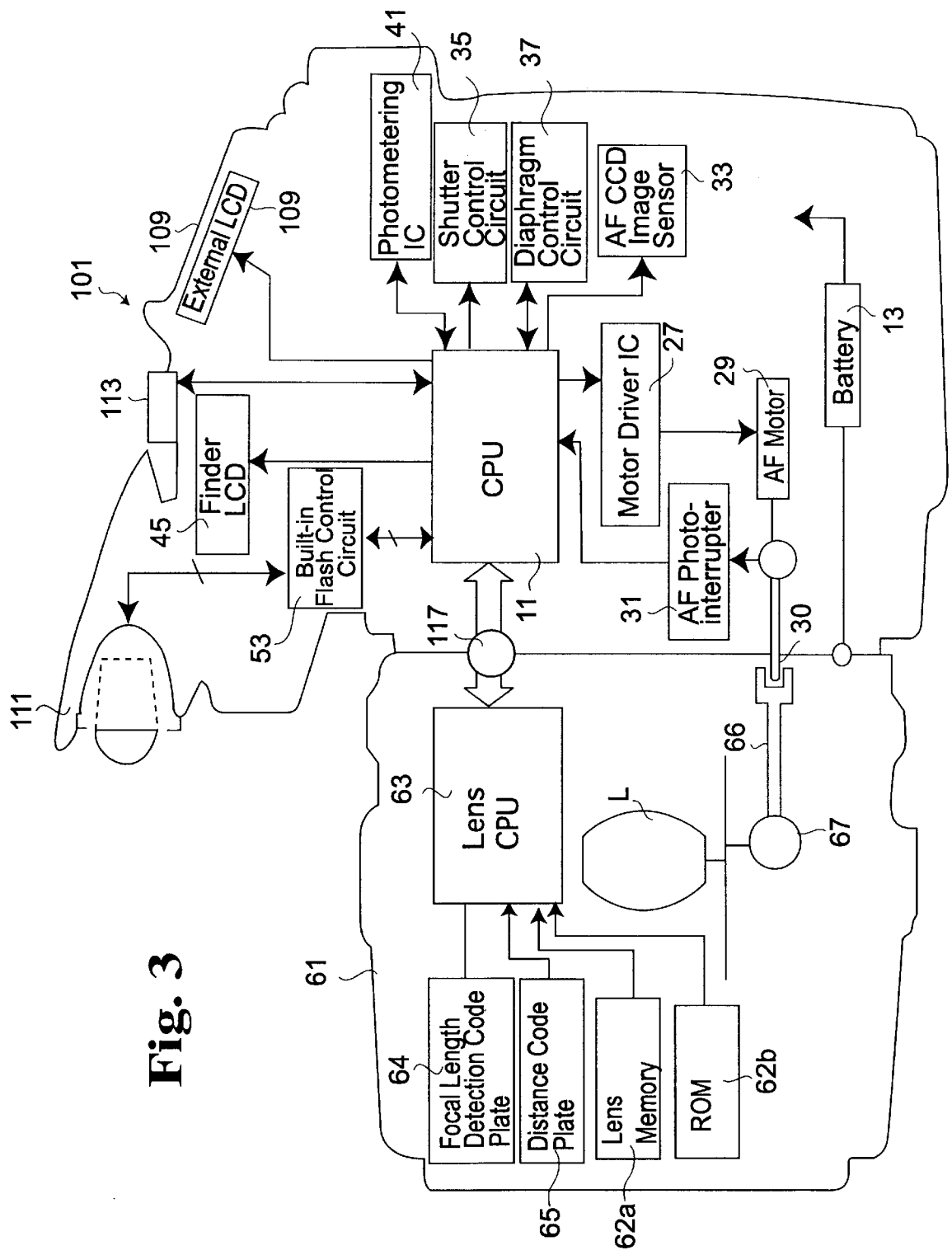
FIG. 3 is a schematic block diagram of fundamental elements of the SLR camera system according to the present invention, showing a state where an interchangeable lens is coupled to the camera body shown in FIG. 1.

Control system of the camera body 101 will be hereinafter discussed in detail with reference to FIGS. 2 and 3. The camera body 101 is provided with the CPU 11 which comprehensively controls the overall operations of the camera system. The CPU 11 functions, at least partly, as a flash controller, a calculating device which calculates the length of interruption (flash interruption value) "K" (see FIG. 4), an auto-flash prohibiting device, and a forced flash discharge device. The CPU 11 is provided therein with a ROM in which control programs regarding various functions of the camera are written and a RAM for temporarily storing information such as various parameters and lens information. As shown in FIG. 2, in addition to the CPU 11, the camera body 101 is provided therein with a voltage regulator 15, an oscillator 17, a first motor driver IC 19, a charge motor 21, a second motor driver IC 23, a film wind motor 25, a third motor driver IC 27, an AF motor 29, an AF photo-interrupter 31, an AF CCD image sensor 33, a shutter control circuit 35, a diaphragm control circuit 37 and an EEPROM 39. The camera body 101 is further provided therein with a photometering IC 41, an aperture value detection resistor 43, a finder LCD 45, a pair of LEDs (green and red LEDs) 47 and eight LEDs (picture mode character illumination LEDs/illumination device) 51 (51a through 51h). The camera body 101 is further provided therein with a main switch SWM, a photometering switch SWS, a release switch SWR, a forced pop-up switch SWPu, a pop-up state detection switch SWPud and a mode dial switch SWMod.

The EEPROM 39, in which information about the number of exposure of a film roll, and various re-writable parameters and modes are written, is connected to the CPU 11. Power of a battery 13 accommodated in a battery chamber (not shown) of the camera body 101 is supplied to the CPU 11 as a constant voltage power via the voltage regulator 15. The CPU 11 supplies the constant voltage power to the oscillator 17 to cause the oscillator 17 to output clock pulses. The CPU 11 operates in synchronism with the clock pulses output from the oscillator 17.

The main switch SWM, the photometering switch SWS, the release switch SWR, the forced pop-up switch SWPu, the pop-up state detection switch SWPud and the mode dial switch SWMod are each connected to the CPU 11. The mode dial switch SWMod is interconnected with the bezel 125.

The main switch SWM is interconnected with the main switch knob 107 so that the main switch SWM is turned ON when the main switch knob 107 is operated. If the main switch SWM is turned ON, the CPU 11 starts operating, so that the CPU 11 supplies power to peripheral elements and at the same time the CPU 11 starts performing various operations which correspond to the ON/OFF states of the switches operated.

The photometering switch SWS and the release switch SWR are interconnected with the release button 105 so that the photometering switch SWS and the release switch SWR are turned ON when the release button 105 is depressed half-way down and fully depressed, respectively. Immediately after the photometering switch SWS is turned ON, the CPU 11 inputs a photometering signal from the photometering IC 41 to calculate the object brightness. Based on this object brightness, the CPU 11 performs an AE calculation process ("AE Calculation Process" shown in FIG. 9) in which the optimum shutter speed and the optimum aperture value in the selected exposure mode are calculated. At the same time the CPU 11 inputs video signals of the object image from the AF CCD image sensor (a phase-difference detection CCD sensor) 33 to calculate the amount of defocus to perform an AF process ("AF Process" shown in FIG. 5B). In the AF process, the CPU 11 drives the AF motor 29 by an amount corresponding to the amount of defocus via the motor driver IC 27 to move a focusing lens group L of the interchangeable lens 61 to an axial position where an in-focus state is obtained. Rotation of the AF motor 29 is transmitted to a joint 66 provided in the interchangeable lens 61 via an AF coupler 30 to drive an focal length adjusting mechanism 67 in the interchangeable lens 61 via the AF coupler 30 and the joint 66 to thereby move the focusing lens group L to an axial position thereof where an in-focus state is obtained. The AF photo-interrupter 31 outputs pulses in association with rotation of the AF motor 29 so that the number of pulses output from the AF photo-interrupter 31 corresponds to the amount of movement of the focusing lens group L. The CPU 11 inputs pulses output from the AF photo-interrupter 31 to control the amount of driving of the AF motor 29 in accordance with the inputs pulses. The photometering IC 41 is provided with a multi-segment photometering sensor, so that the camera measures and compares photometric readings in segmented areas of the photographic field.

Immediately after the release switch SWR is turned ON, the CPU 11 drives a quick-return mirror 160 (see FIG. 1) to rise, controls the diaphragm control circuit 37 to stop down the iris diaphragm of the interchangeable lens 61 in accordance with the aperture value determined by the AE calculation process and subsequently controls the shutter circuit 35 to release the shutter (focal plane shutter) in accordance with the determined shutter speed. Upon the completion of exposure, the CPU 11 drives the charge motor 21 via the motor driver IC 19 to make the quick-return mirror 160 fall back and to charge the shutter mechanism, i.e., charge the drive springs of the leading and trailing curtains of the shutter mechanism. Subsequently the CPU 11 drives the film wind motor 25 via the motor driver IC 23 to wind film by one frame.

The forced pop-up switch SWPU is interconnected with a forced pop-up button or knob (not shown) provided on the camera body 101 in the vicinity of the built-in flash 111. Immediately after the forced pop-up switch SWPu is turned ON, i.e., the forced pop-up button is depressed, the CPU 11 turns a switching transistor Tr1 (shown in FIG. 2) ON to supply power to a pop-up magnet PuMg (shown in FIG. 2) to thereby release the engagement of the hold mechanism with the built-in flash 111 held at the retracted positioned thereof by the hold mechanism. Upon the release of the engagement of the hold mechanism with the built-in flash 111, the built-in flash 111 pops up by the aforementioned spring of the pop-up mechanism to be positioned at discharge position. The CPU 11 detects that the built-in flash 111 has popped up to the discharge position via the pop-up state detection switch SWPud, which is turned ON when the built-in flash 111 rises to the discharge position. The pop-up state detection switch SWPud is turned OFF when the built-in flash 111 moves from the discharge position towards the retracted position.

If the CPU 11 detects low-light and/or backlight conditions in accordance with data such as object brightness data obtained from the photometering IC 41 and ISO speed data, the CPU 11 supplies power to the pop-up magnet PuMg to make the built-in flash 111 pop-up so as to make it discharge automatically. When an external flash 71 (see FIG. 2) is attached to the hot shoe 113, the CPU 11 prohibits the built-in flash 111 from popping up to prevent the built-in flash 111 from bumping against the external flash 71 when the CPU 11 controls the external flash 71 instead of the built-in flash 111.

Various types of external flashes can be coupled to the hot shoe 113 as an alternative to a dedicated external flash. The CPU 11 controls the external flash attached to the hot shoe 113 to discharge and stop discharging. In the case where the dedicated external flash 71 having a flash CPU 73 (see FIG. 2) is attached to the hot shoe 113, the CPU 11 communicates with the flash CPU 73 to input flash data from the flash CPU 73.

The mode dial switch SWMod is a four-bit code switch which is turned ON and OFF in accordance with the rotational stop position (click-stop position) of the bezel 125. The CPU 11 selects one of the thirteen modes, functions or parameters which corresponds to one of the thirteen characters 124a, 124b, 124c, 124d, 124e, 125f, 125g, 125h, 125i, 125j, 125k, 125l or 125m which the index mark 127 is set to, i.e., which corresponds to the click-stop position of the bezel 125.

The finder LCD 45, which is positioned to be seen in the viewfinder, and the external LCD panel 109 are connected to the CPU 11. Each of the finder LCD 45 and the external LCD panel 109 indicates various photographic information such as frame number, shutter speed, aperture value. In a state where the main switch SWM is OFF, nothing is indicated on the finder LCD 45 while information necessary prior to picture taking is indicated on the external LCD panel 109. Such information includes, e.g., film status information (loaded/advance/rewind), film counter indication if film is properly loaded, and rewind completion state. In a state where the main switch SWM is ON, in addition to the film counter indication but also the currently selected shutter speed/mode and other information are indicated on the external LCD panel 109, whereas nothing is indicated on the finder LCD 45 yet until the AE calculation process starts to be performed by an operation of the mode dial 121. After the AE calculation process is performed, the calculated optimum shutter speed, aperture value and other useful information are indicated on each of the finder LCD 45 and the external LCD panel 109.

Two LEDs 47 (a green LED 47a and a red LED 47b) illuminate information indicated on the finder LCD 45. The CPU 11 turns the green LED 47a ON in a normal photographic condition, while the CPU 11 turns the red LED 47b ON in a warning condition (e.g., when the selected shutter speed is slower than a slowest shutter speed calculated to prevent blurred images due to hand movement) to illuminate the finder LCD 45 by red light so as to warn the user that a desired photographic image will not be obtained.

Eight transistors Tr for driving the eight LEDs (picture mode character illumination LEDs 51a through 51h) 51 independently of one another which illuminate the eight characters 124a through 124h of the first group 123a on the mode indication disk 123, respectively, are connected to the CPU 11. In the illustrated embodiment, when the main switch SWM is turned ON or when one of the program modes represented by the corresponding one of the first group of characters 123a (124a through 124h) is selected by an operation of the bezel 125, the corresponding one of the eight LEDs 51a, 51b, 51c, 51d, 51e, 51f, 51g and 51h is turned ON to illuminate the corresponding character 124a, 124b, 124c, 124d, 124e, 124f, 124g or 125h by turning the corresponding transistor Tr ON in a corresponding predetermined manner.

In a state where the interchangeable lens 61 having the lens CPU 63 is coupled to the camera body 101, the CPU 11 data-communicates with the lens CPU 63 to input various lens information such as the focal length (the current focal length if the lens 61 is of a zoom lens), the object distance (the position of the focal lens group L) and the open aperture value. The lens CPU 63 detects the focal length via a focal length detection code plate 64 (see FIG. 3) and further detects the object distance (the position of the focal lens group L) via a distance code plate 65 to send the detected focal length and the detected object distance to the CPU 11 of the camera body 101.

Figure 4:
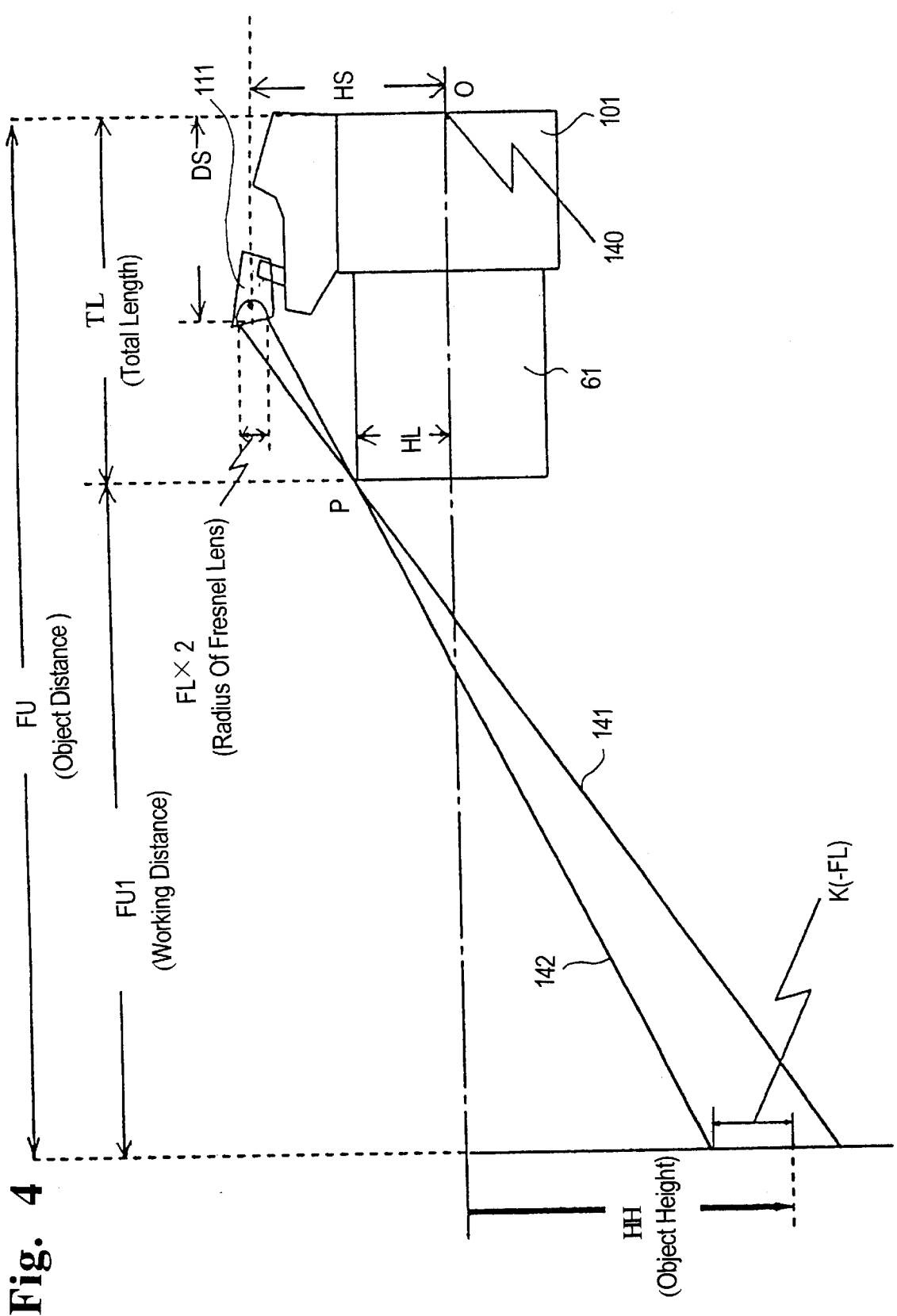
FIG. 4 is an explanatory view of the camera system shown in FIG. 1 and the flashlight emitted from the flash of the camera body, showing a state where the flashlight is interrupted by the periphery of the attached interchangeable lens, and also showing a principle of calculating the length of interruption "K"

The lens CPU 63 communicates with the CPU 11 of the camera body 101 to input lens data necessary for judging, via a predetermined calculation, whether the flashlight emitted from the built-in flash 111 or the external flash 71 will be interrupted by the periphery of the attached interchangeable lens 61. FIG. 4 shows a state where the flashlight emitted from the built-in flash 111 is interrupted by the periphery of the attached interchangeable lens 61. FIG. 4 is also applicable for the case where the external flash 71 is attached to the hot shoe 113 of the camera body 101. An embodiment of a method of obtaining information on the flashlight interruption by the predetermined calculation will be hereinafter discussed in detail with reference to FIG. 4. For the purpose of simplifying the explanation, it is herein assumed that the cover angle of view (flash coverage) of the flash (111 or 71) is greater than the angle of view of the attached lens 61.

Among the rays of light emitted from each of the upper and lower edges of the Fresnel lens of the flash (111 or 71), part of rays of light which travel downwardly towards the attached lens 61 are incident on the attached lens 61. A first ray of light 141, which is one of the rays of light emitted from the upper edge of the Fresnel lens of the flash (111 or 71) and is tangent to an frontmost top end point "P" of the attached lens 61, and a second ray of light 142, which is one of the rays of light emitted from the lower edge of the Fresnel lens of the flash (111 or 71) and is tangent to the frontmost top end point "P" of the attached lens 61, will be hereinafter discussed to simplify the explanation about the incident light of the flash (111 or 71) on the attached lens 61.

In FIG. 4, "FU" represents the object distance, "HH" represents the object height (the height of the object to be photographed from the optical axis O down at the location of the object distance FU), "HL" represents the radius of the front end of the attached lens 61, "FU1" represents the working distance (the distance from the front end to the object which is to be photographed to the object), "TL" represents the total length from a film plane (picture plane) 140 to the front end of the attached lens 61, "$H_S$" represents the height of the flash (the vertical length from the optical axis O to the center of the light emitting surface of the Fresnel lens of the flash), "$D_S$" represents the position of the flash (the horizontal length from the center of the film plane 140 to the center of the Fresnel lens of the flash), "FL" represents the radius of the Fresnel lens of the flash (a half of the vertical length of the Fresnel lens), and "K" represents the length of interruption in the vertical direction.

Data of the total length "TL" and the radius "HL" are written in a non-volatile memory (lens memory) 62a (e.g., a flash memory) provided in the attached lens 61, whereas the object distance "FU" and the object height "HH" are calculated by the lens CPU 63 in accordance with the data input from the focal length detection code plate 64 and the distance code plate 65. The total length "TL", the radius "HL", the object distance "FU" and the object height "HH" are sent to the CPU 11 of the camera body 101 via data-communication between the CPU 11 and the lens CPU 63. Note that the total length "TL" is a constant if the attached lens 61 is, e.g., a normal (non-zoom) internal-focusing lens whose front end does not move back and forth, whereas the total length "TL" is a variable if the attached lens 61 is, e.g., a zoom lens whose front end moves back and forth. Therefore, if the attached lens 61 is a zoom lens, the total length "TL" is calculated in accordance with data input from the focal length detection code plate 64 and the distance code plate 65.

The length of interruption "K" is calculated using the following equation:

$$K = HH + FU1(HL - H_S \pm FL)(TL - D_S);$$

wherein the positive FL ("+FL") of "FL" is used for the first ray of light 141, while the negative FL ("−FL") of "FL" is used for the second ray of light 142.

In the case shown in FIG. 4, among all the rays of light emitted from the lower edge of the Fresnel lens of the flash (111 or 71), rays of lights which travel below the second ray of light are interrupted by the attached lens 61 by an amount corresponding to the length of interruption "K". In the present embodiment, the CPU 11 calculates the length of interruption "K" and judges whether the flashlight will be interrupted by the periphery of the attached lens 61 in accordance with the calculated length of interruption "K".

Accordingly, in order to calculate the length of interruption "K" on the flashlight due to the attached lens 61, the CPU 11 needs to input the object distance "FU", the object height "HH", the radius "HL" and the total length "TL" as data peculiar to the attached lens 61, from the attached lens 61, while the CPU 11 further needs to input the height of the flash "$H_S$", the position of the flash "$D_S$" and the radius of the Fresnel lens of the flash "FL" as data peculiar to the external flash 71 from the external flash 71 if it is attached to the hot shoe 113. The attached lens 61 is provided therein with a ROM 62b in which the aforementioned radius "HL" and the aforementioned total length "TL" are written. The aforementioned object distance "FU" and the aforementioned object height "HH" are calculated by the lens CPU 63 in accordance with the data input from the focal length detection code plate 64 and the distance code plate 65 to be sent to the CPU 11 of the camera body 101 via a data-communication between the CPU 11 and the lens CPU 63. The external flash 71 is provided therein with a ROM 72 in which data of the aforementioned height "$H_S$", the aforementioned position "$D_S$" and the aforementioned radius "FL" of the Fresnel lens are written in advance which are to be sent as flash data to the CPU 11 of the camera body 101 via data-communication between the flash CPU 73 and the CPU 11.

Operations of the SLR camera system (the camera body 101) provided with the mode dial 121 will be hereinafter discussed in detail with reference to flow charts shown in FIGS. 5A through 12. The processes represented by the flow charts shown in FIGS. 5A through 12 are performed by the CPU 11 in accordance with the programs written in the internal ROM of the CPU 11.

[Main Process]

A main process ("MAIN" shown in FIGS. 5A and 5B) is performed with the battery 13 loaded in the camera body 101. Immediately after the battery cover (not shown) of the camera body 101 is closed with the battery 13 loaded therein, a CPU initializing process is performed in which each of input and output ports and the internal RAM of the CPU 11 are initialized (step S11). Subsequently, peripheral circuits connected to the input and output ports are also initialized (step S13). Subsequently, a reference timer in the CPU 11 is started (step S15). The operations at steps S11, S13 and S15 are performed immediately after the battery cover is closed with the battery 13 loaded in the camera body 101, and thereafter operations at and after step S17 are repeatedly performed with the battery 13 loaded.

A 250 ms interval timer in the CPU 11 is started (step S17), an ON/OFF state of each switch is input in the CPU 11 (step S19), and it is determined whether the main switch SWM is ON (step S21). The 250 ms interval timer is adapted to set intervals at which the CPU 11 periodically checks if the main switch SWM is ON.

If it is determined at step S21 that the main switch SWM is OFF, control proceeds to step S23 at which an external LCD indication process is performed in which the external LCD 109 is controlled to indicate a character or characters which informs the user that the power is currently OFF. Subsequently, the LEDs 51a through 51h are turned OFF (step S25). Subsequently, it is determined whether 250 ms has elapsed since the 250 ms interval timer started (step S27). If it is determined at step S27 that 250 ms has elapsed, control returns to step S17 at which the 250 ms interval timer is started and the operations from step S19 to step S27 are performed again. The aforementioned operations from step S17 to step S27 are repeatedly performed during the time the main switch SWM is OFF.

If it is determined at step S21 that the main switch SWM is turned ON, control proceeds to step S29 at which it is determined if the main switch SWM was previously OFF. If it is determined at step S29 that the main switch SWM was previously OFF, it means that control has entered the operation at step S29 for the first time since the main switch SWM was turned ON, therefore, control proceeds to step S31 at which an opening indication process is performed. In the opening indication process, each of the eight LEDs 51a through 51h is firstly turned ON and subsequently turned OFF in accordance with a predetermined algorithm, and only one of the eight LEDs 51a through 51h which corresponds to one of the eight program modes (the flash-prohibiting auto picture mode, the night portrait mode, the sports action mode, the close-up mode, the landscape mode, the portrait mode, the standard mode, and the auto picture mode) selected last by the bezel 125 is turned ON at the end. If it is determined at step S29 that the main switch SWM was not previously OFF, control skips step S31 to proceed to step S33.

A built-in flash pop-up process ("Built-in Flash Pop-up Process" described in FIG. 6) is performed at step S33. In the built-in flash pop-up process, if it is determined that the forced pop-up switch SWPU is ON, the switching transistor Tr1 is turned ON to supply power to the pop-up magnet PuMg to make the built-in flash 111 pop-up. Details of the built-in flash pop-up process will be discussed later.

It is determined at step S35 whether the pop-up state detection switch SWPud is ON, i.e., whether the built-in flash 111 has popped up. If it is determined at step S35 that the pop-up state detection switch SWPud is ON, control proceeds to step S37 at which a built-in flash charging process is performed. If it is determined at step S35 that the pop-up state detection switch SWPud is OFF, control skips step S37 to proceed to step S39.

An LCD indication process is performed at step S39. In this LCD indication process in a power ON state of the camera body 101, useful information such as the currently selected shutter speed is indicated on the external LCD panel 109, while nothing is indicated on the finder LCD 45 until the AE calculation process starts to be performed by an operation of the mode dial 121.

It is determined at step S41 whether the photometering switch SWS is turned ON. It is determined at step S43 whether the release switch SWR is turned ON. If neither the photometering switch SWS nor the release switch SWR are turned ON, it is determined at step S45 whether a state of the mode dial switch SWMod has changed. If it is determined at step S45 that the state of the mode dial switch SWMod has not changed, control returns to step S27.

Control proceeds to step S49 if it is determined at step S41 that the photometering switch SWS is turned ON, if it is determined at step S43 that the release switch SWR is turned ON, or if it is determined at step S45 that the state of the mode dial switch SWMod has changed.

A photometering timer setting process is performed at step S49. In the photometering timer setting process, the number of times of performing a switch check process from step S53 to step S87 is set to a predetermined number of times. Following the photometering timer setting process, the CPU 11 waits for the release switch SWR to be turned ON while performing the switch check process at intervals shorter than the intervals of the 250 ms interval timer. Further, in the case where the release switch SWR is not yet turned ON even if the switch check process has performed the aforementioned predetermined number of times, control returns to step S17. In the present embodiment, the interval timer used in the photometering timer setting process is an 125 ms interval timer (photometering timer), and the number of times of performing the switch check process is set to 80 to be registered in a counter (COUNTER).

After the photometering timer setting process is performed at step S49, the 125 ms interval timer is started (step S51). Thereafter, an ON/OFF state of each switch is inputted into the CPU 11 (step S53) and subsequently it is determined whether the main switch SWM is OFF (step S55). If it is determined at step S55 that the main switch SWM is OFF, control proceeds to step S89 at which a flashlight prohibition flag is set to 0. Subsequently, a backlight for the finder LCD 45 is turned OFF (step S91), the LEDs 51a through 51h are turned OFF (step S93), and control returns to step S17. If it is determined at step S55 that the main switch SWM is ON, control proceeds to step S57.

At step S57 the lens data including F-number at open aperture, the current focal length, and the information on flashlight interruption of the built-in flash 111 by the attached lens are inputted into the CPU 11. Subsequently, the photometered value (brightness value Bv) is inputted into the CPU 11 from the photometering IC 41 (step S59), and the set aperture value is inputted (step S61). The set aperture value, which is set by manually rotating an aperture setting ring (not shown) of the photographic lens 61, is detected from the resistance value of an aperture value detection resistor 43. In the case where the aperture setting ring is set to setting "A" (auto), the CPU 11 does not use the information on the resistance value of the aperture value detection resistor 43 but calculates the aperture value Av in the AE calculation process which is performed at step S63.

The shutter speed or time value Tv and the aperture value Av are calculated in the AE calculation process ("AE Calculation Process" described in FIG. 9) at step S63. In the AE calculation process, the optimum shutter speed Tv and the optimum aperture value Av are calculated based on the photometered value, the film speed and the exposure compensation value, in accordance with a predetermined algorithm which corresponds to the selected exposure mode. Details on the AE calculation process will be discussed later.

After the AE calculation process is performed, the built-in flash pop-up process ("Built-in Flash Pop-up Process" described in FIG. 6) is performed in accordance with the set shutter speed Tv and the set aperture value Av (step S65). In the built-in flash pop-up process, it is determined whether the built-in flash 111 needs to pop-up, and power is supplied to the pop-up magnet PuMg to make the built-in flash 111 pop-up if it is determined that the built-in flash 111 needs to pop-up. Details of the built-in flash pop-up process will be discussed later. After the built-in flash pop-up process is performed at step S65, it is determined whether the built-in flash 111 has popped up (step S67). If it is determined that the built-in flash 111 has popped up, control proceeds to step S69 at which the built-in flash charging process is performed and thereafter control proceeds to step S71. If it is determined that the built-in flash 111 has not yet popped up, control skips step S69 to proceed to step S71.

An LCD indication process is performed at step S71. In this LCD indication process, various useful information such as the set shutter speed is indicated on the external LCD panel 109, while various useful information such as a current focus state, the set shutter speed, a hand-shake warning indication and flash discharge mode are indicated on the finder LCD 45 while the user is viewing an object through the finder.

Thereafter, a finder LCD backlight lighting process is performed at step S73. In the finder LCD backlight lighting process, the green LED 47a is turned ON in a normal photographic condition, while the red LED 47b is turned ON in a warning condition (e.g., when the selected shutter speed is slower than the slowest shutter speed calculated to prevent blurred images due to hand movement).

After the finder LCD backlight lighting process is performed at step S73, a picture mode indication lighting process is performed at step S75. In the picture mode indication lighting process, in the case where the auto picture mode or the flash-prohibiting auto picture mode is selected, one of the LEDs 51a through 51h which corresponds to the programmed exposure mode which has been selected in the AE calculation process at step S63 is turned ON.

After the picture mode indication lighting process is performed at step S75, the AF process is performed at step S77. In the AF process, the AF CCD image sensor 33 is driven, video signals of object images are input to the CPU 11, and the AF motor 29 is driven by an amount corresponding to the amount of defocus to move the focusing lens group L of the interchangeable lens 61 to an axial position where an in-focus state is obtained.

Subsequently, it is determined whether the release switch SWR is turned ON (step S79). Control returns to step S49 upon performing a shutter release process (S95) if it is determined at step S79 that the release switch SWR is turned ON. If it is determined at step S79 that the release switch SWR is not turned ON, it is determined at step S81 whether 125 ms has elapsed (i.e., whether the 125 ms interval timer is up). If it is determined at step S81 that 125 ms has not yet elapsed, the operation at step S81 is repeatedly performed to wait for the 125 ms interval timer to elapsed. If it is determined at step S81 that 125 ms has elapsed, it is determined whether the counter value is zero (step S83). If it is determined that the counter value is not zero, the counter value is decreased by one (step S85) and control returns to step S53. Accordingly, during the time the main switch SWM is ON while the release switch SWR is OFF, the operations from step S53 through step S85 are repeatedly performed eighty times until the counter value, whose initial value is 80, becomes zero. Note that 10 seconds (125 ms×80=10 sec) elapses if the operations from step S53 through step S85 are repeatedly performed eighty times.

If it is determined at step S83 that the counter value is zero, control proceeds to step S87 at which it is determined whether the photometering switch SWS is turned ON. If it is determined the photometering switch SWS is turned ON, control returns to step S53. Namely, even if ten seconds elapses, the operations at step S53 through step S83 and step S87 are repeatedly performed as long as the photometering switch SWS is ON. If it is determined at step S87 that the photometering switch SWS is not ON, control proceeds to step S89 at which the flashlight prohibition flag is set to 0. Note that each of the built-in flash 111 and the external flash 71 is allowed to discharge at a time of exposure if the flashlight prohibition flag is zero, while the same is prohibited from discharging at a time of exposure if the flashlight prohibition flag is set at 1. Subsequently, the backlight for the finder LCD 45 is turned OFF (step S91), the LEDs 51a through 51h are turned OFF (step S93), and control returns to step S17. At step S91, the CPU 11 turns OFF one of the LEDs 51a through 51h which corresponds to the programmed exposure mode selected in the AE calculation process at step S63 and which is turned ON in the picture mode indication lighting process at step S75 in the case where the auto picture mode or the flash-prohibiting auto picture mode is selected.

[Built-in Flash Pop-up Process]

Figure 5A:
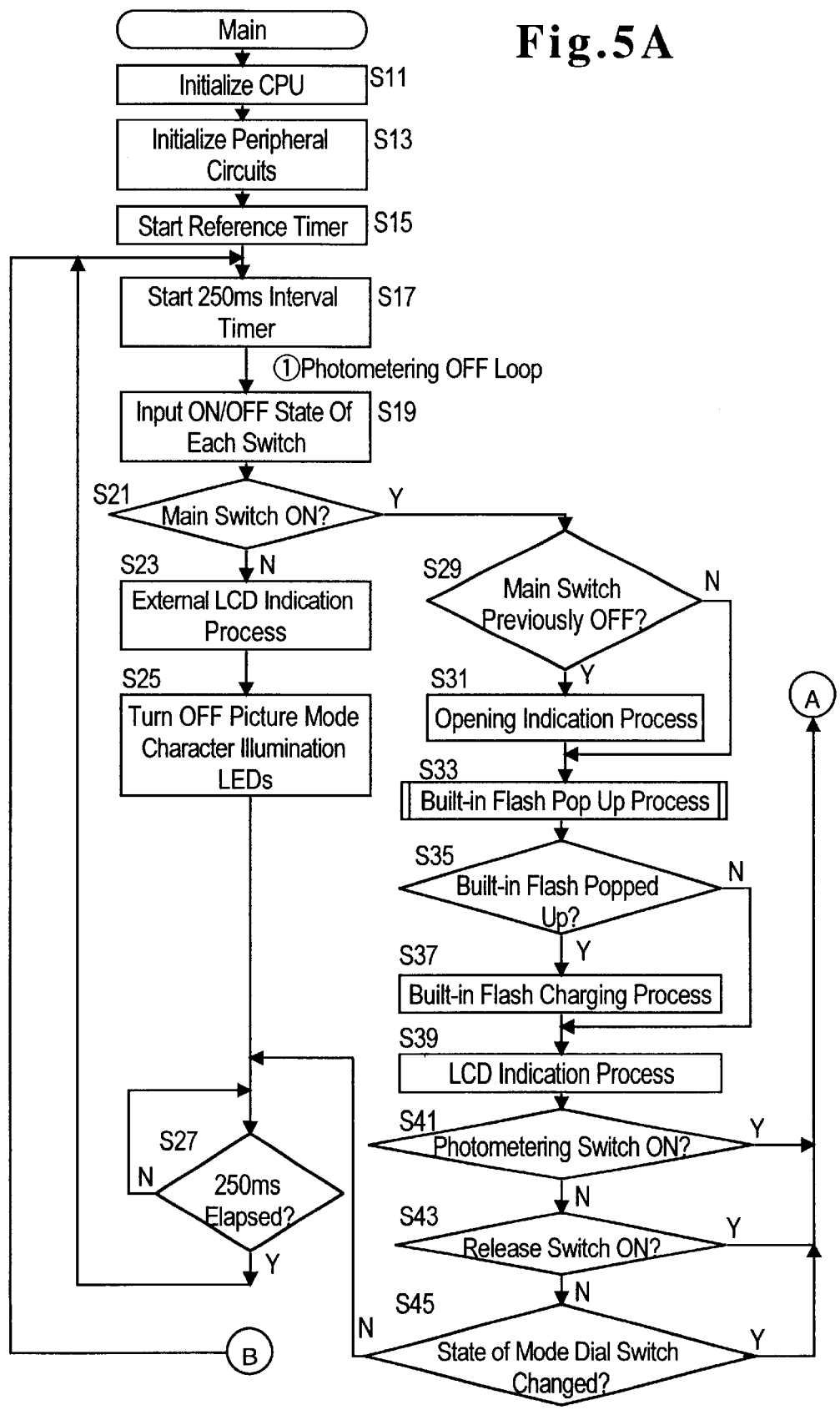
FIGS. 5A and 5B show a flow chart of an embodiment of a main process regarding fundamental operations of the SLR camera system shown in FIG. 3.

The built-in flash pop-up process, which is performed at step S33 or S65 in the main process shown in FIGS. 5A and 5B, will be hereinafter discussed in detail with reference to the flowchart shown in FIG. 6. In this process, the switching transistor Tr1 is turned ON to supply power to the pop-up magnet PuMg to make the built-in flash 111 pop-up on condition that a mode other than the flash-prohibiting auto picture mode is selected and that conditions necessary for having the built-in flash 111 discharge are all set. Furthermore, if the built-in flash 111 is forcibly retracted (e.g., manually by the user) after the built-in flash 111 is popped up, the built-in flash 111 is prohibited from popping up automatically until the photometering timer, which is started at step S51, has elapsed.

In the built-in flash pop-up process, firstly it is determined whether the flash-prohibiting auto picture mode has been selected (step S201). If the flash-prohibiting auto picture mode has been selected, the built-in flash 111 is prohibited from discharging, so that control returns.

If it is determined at step S201 that the flash-prohibiting auto picture mode is not selected (i.e., a mode other than the flash-prohibiting auto picture mode is selected), it is determined whether the flashlight prohibition flag is 1 (step S203). If the flashlight prohibition flag is not 1, it is determined whether the built-in flash 111 has popped up (step S205). The default of the flashlight prohibition flag is set to zero. If it is determined at step S203 that the flashlight prohibition flag is 1 or it is determined at step 205 that the built-in flash 111 has popped up, control returns to the main process. If it is determined at step 205 that the built-in flash 111 has not popped up, it is determined whether an auto-pop-up flag is 1 (step S207). The auto-pop-up flag indicates whether the built-in flash 111 has automatically popped up. The default of the auto-pop-up flag is set to zero. The auto-pop-up flag is set to 1 at step S251 shown in FIG. 8.

If it is determined at step S207 that the auto-pop-up flag is zero, a built-in flash forced pop-up process ("Built-in Flash Forced Pop-up Process" described in FIG. 7) is performed (step S213). Subsequently, it is determined whether an auto-flashlight permission flag is 1 (step S215). If it is determined at step S215 that the auto-flashlight permission flag is 1, a built-in flash auto pop-up process ("Built-in Flash Auto Pop-up Process" described in FIG. 8) is performed (step S217) and subsequently control returns to the main process. If it is determined at step S215 that the auto-flashlight permission flag is not 1, control returns to the main process. The auto-flashlight permission flag indicates whether the built-in flash 111 is permitted from discharging automatically. The default of the auto-flashlight permission flag is set to zero. If it is determined at step S207 that the auto-pop-up flag is 1, control proceeds to step S209 at which the flashlight prohibition flag is set to 1. Subsequently, the auto-pop-up flag is set to 0 (step S211), and control returns to the main process.

[Built-in Flash Forced Pop-up Process]

Figure 6:
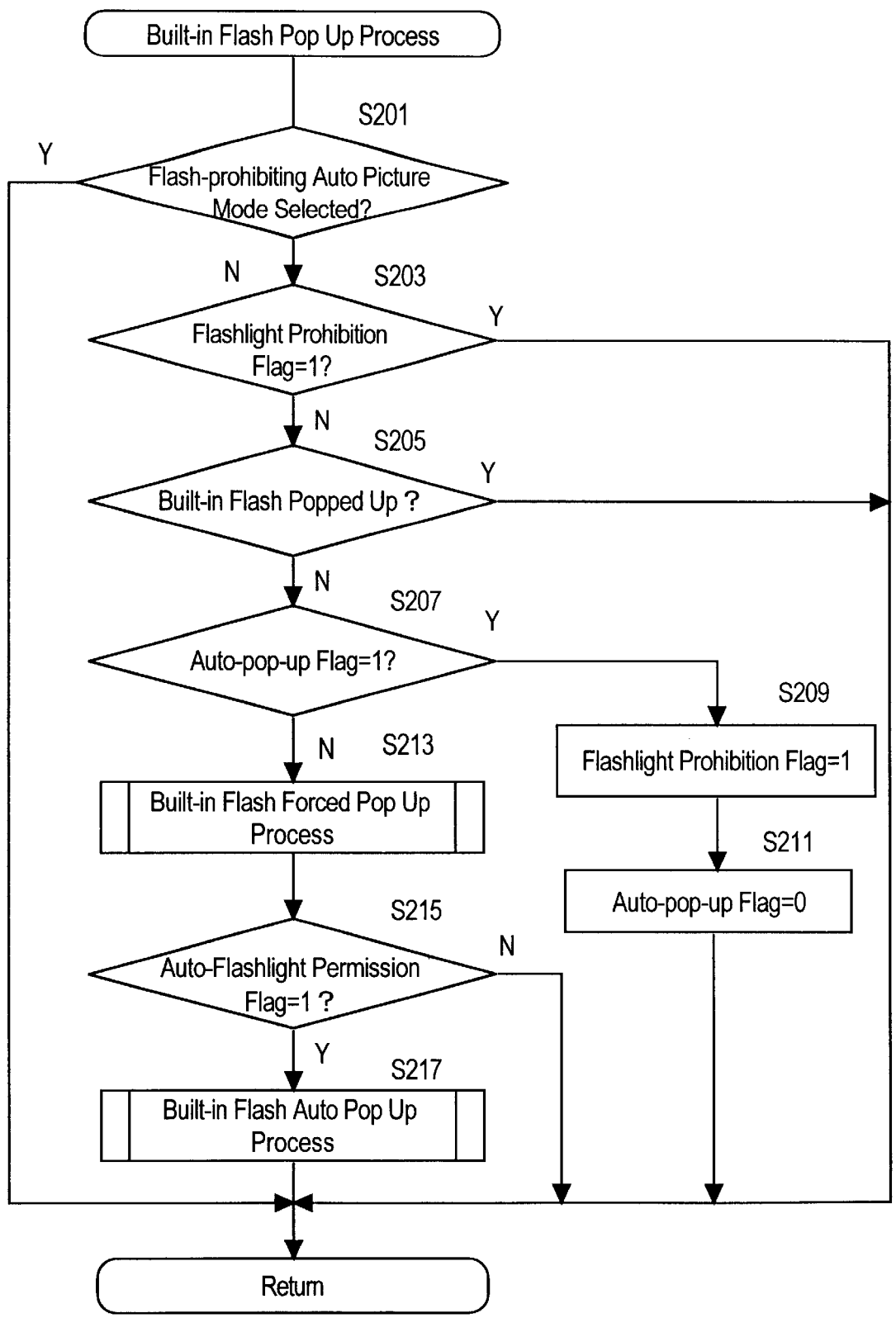
FIG. 6 is a flow chart of the subroutine "Built-in Flash Pop-up Process" shown in FIGS. 5A and 5B.
Figure 7:
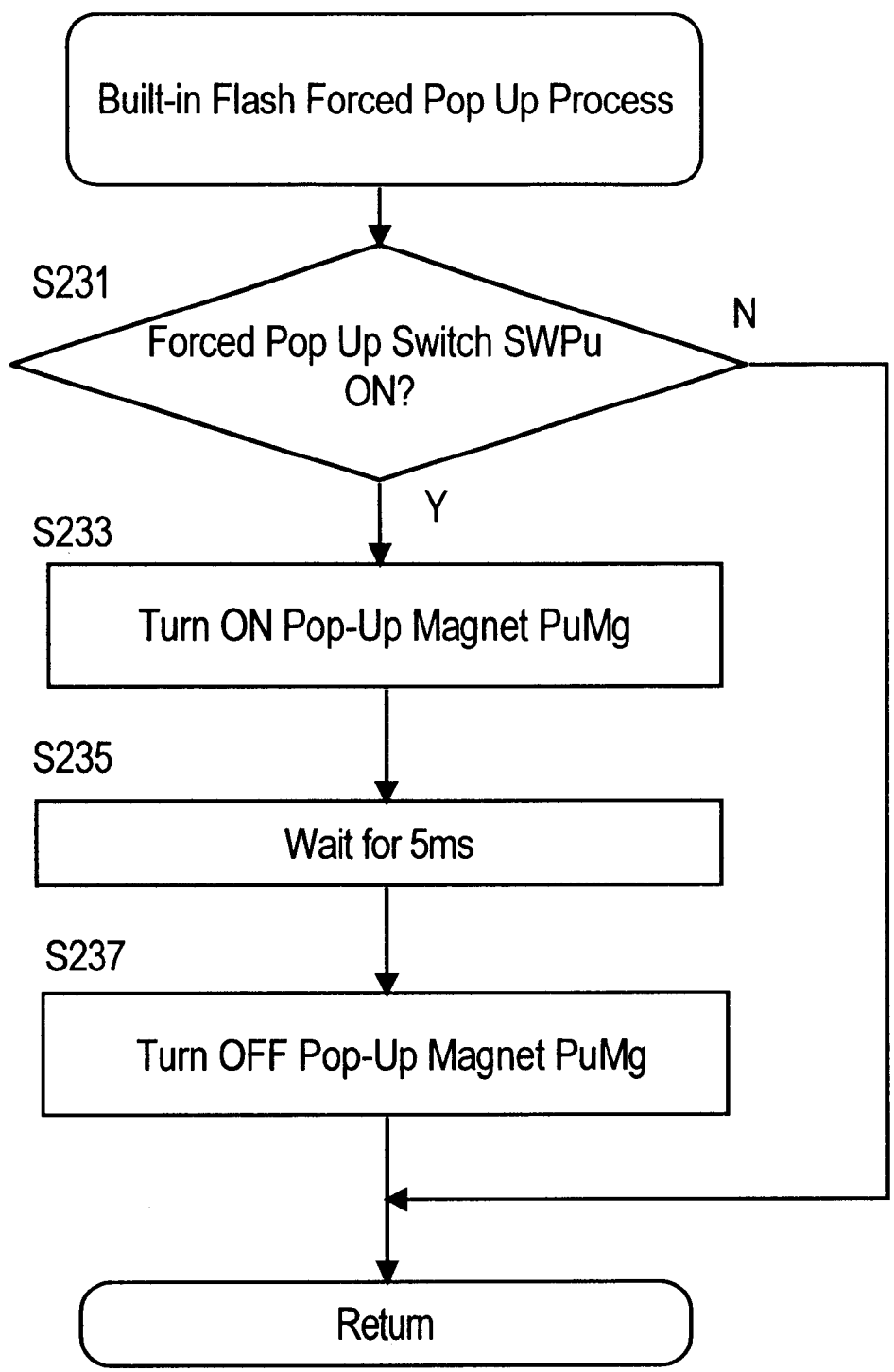
FIG. 7 is a flow chart of the subroutine "Built-in Flash Forced Pop-up Process" shown in FIG. 6.

The built-in flash forced pop-up process, which is performed at step S213 in the built-in flash pop-up process shown in FIG. 6, will be hereinafter discussed in detail with reference to the flow chart shown in FIG. 7. In this process, firstly it is determined whether the forced pop-up switch SWPu (forced discharge switch) is ON (step S231). If it is determined that the forced pop-up switch SWPu is ON, the pop-up magnet PuMg is turned ON (power starts to be supplied) at step S233. Subsequently, control waits for 5 ms so that power keeps to be supplied to the pop-up magnet PuMg for 5 ms (step S235). Subsequently, the engagement of the hold mechanism with the built-in flash 111 is released by turning the pop-up magnet PuMg OFF to make the built-in flash 111 pop-up by the spring force of the spring of the pop-up mechanism (step S237). The pop-up state detection switch SWPud is turned ON when the built-in flash 111 has risen, so that the CPU 11 can determine that the built-in flash 111 has risen by checking the ON/OFF state of the pop-up state detection switch SWPud. It is determined at step S231 that the forced pop-up switch SWPu is not ON, control skips the operation from step S233 to S237 to return to the main process.

[Built-in Flash Auto Pop-up Process]

Figure 8:
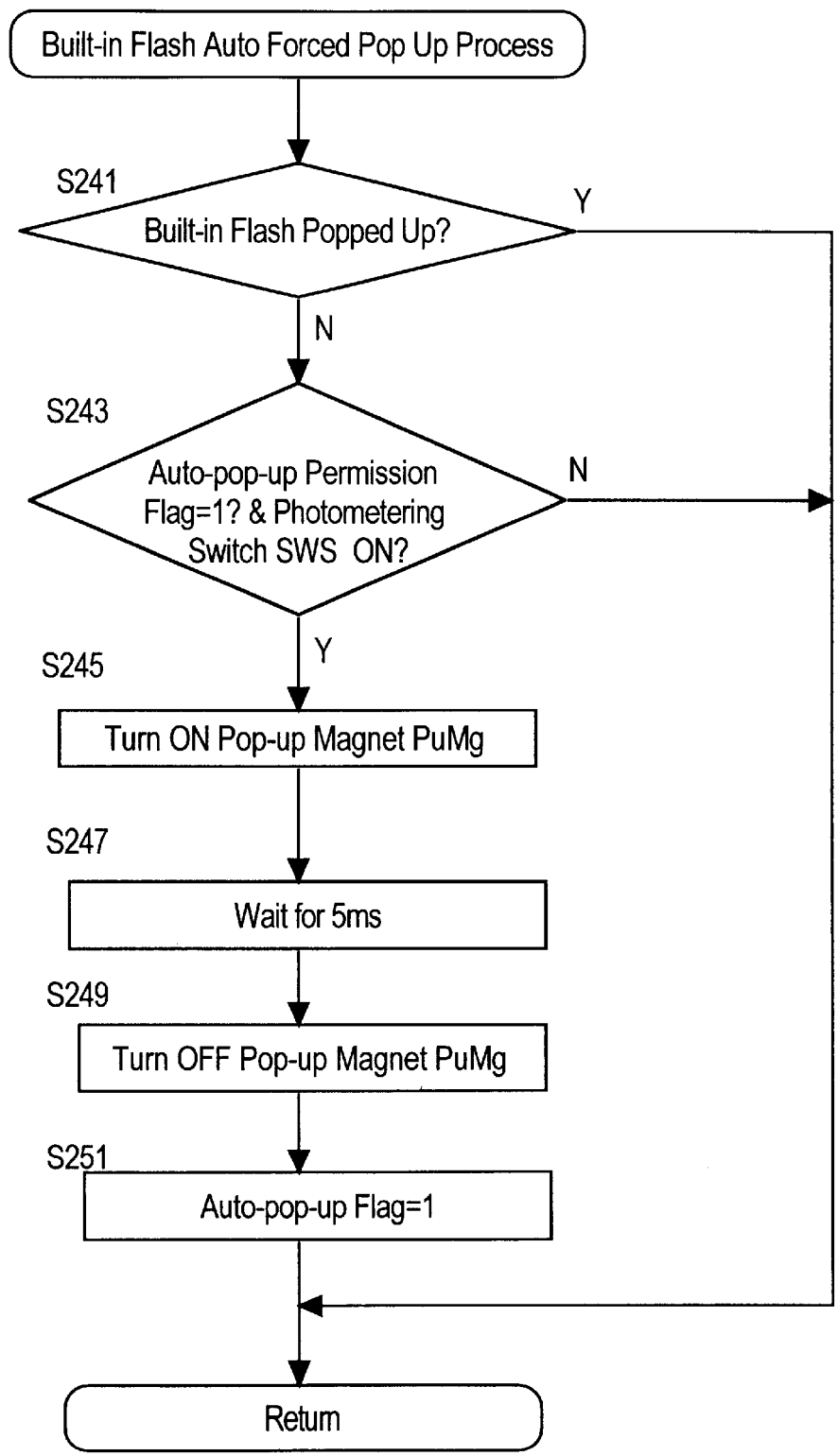
FIG. 8 is a flow chart of the subroutine "Built-in Flash Auto Pop-up Process" shown in FIG. 6.

The built-in flash auto pop-up process, which is performed at step S217 in the built-in flash pop-up process shown in FIG. 6, will be hereinafter discussed in detail with reference to the flow chart shown in FIG. 8. As can be seen from the flow chart shown in FIG. 8, in a state where the built-in flash 111 is retracted, it is popped up through the built-in flash auto pop-up process when conditions necessary for having the built-in flash 111 discharge are all set. In the built-in flash auto pop-up process, firstly it is determined whether the pop-up state detection switch SWPud is ON so as to know if the built-in flash 111 has popped (step S241). If it is determined at step S241 that the pop-up state detection switch SWPud is ON, it means that the built-in flash 111 has already popped, so that control returns to the main process. If the pop-up state detection switch SWPud is not ON, it is determined whether an auto-pop-up permission flag is 1 while the photometering switch SWS is ON (step S243).

The auto-pop-up permission flag is set to 1 on condition that the built-in flash 111 is retracted if it is judged in the AE calculation process (which includes an auto-discharge judging process shown in FIGS. 10A and 10B) that the built-in flash 111 should discharge. If the auto-pop-up permission flag is not 1 or the photometering switch SWS is not ON at step S243, control returns to the main process. If the auto-pop-up permission flag is 1 while the photometering switch SWS is ON at step S243, control proceeds to step S245. The pop-up magnet PuMg is turned ON (power starts to be supplied) at step S245. Subsequently, control waits for 5 ms so that power continues to be supplied to the pop-up magnet PuMg for 5 ms (step S247). Subsequently, the engagement of the hold mechanism with the built-in flash 111 is released by turning the pop-up magnet PuMg OFF to make the built-in flash 111 pop-up by the spring force of the spring of the pop-up mechanism (step S249). Subsequently, the auto-pop-up flag is set to 1 (step S251) and control returns to the main process.

Figure 5B:
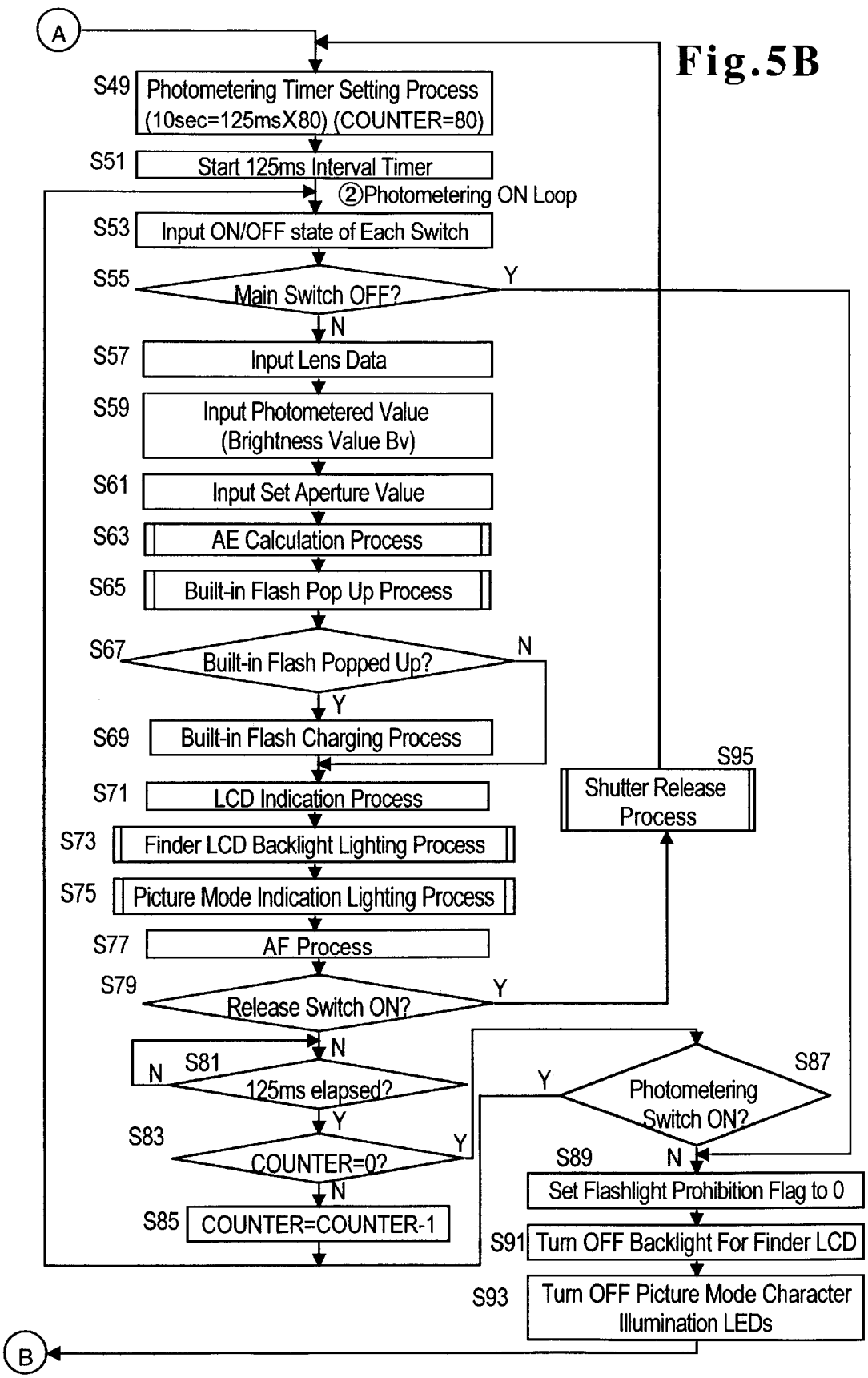

If the built-in flash 111 is made to pop-up in the built-in flash pop-up process performed at step S65 in the main process shown in FIG. 5B, the pop-up state detection switch SWPud is turned ON and the auto-pop-up flag is set to 1. Therefore, the next time control re-enters the built-in flash pop-up process, control comes out of the built-in flash pop-up process from step S205 to return to the main process. On the other hand, if the built-in flash 111 is retracted manually by the user after the built-in flash 111 is popped up, the pop-up state detection switch SWPud is turned OFF, so that at step S207 control proceeds to step S209 in the built-in flash pop-up process when control enters it for the first time since the pop-up state detection switch SWPud is turned OFF. Thereafter, the flashlight prohibition flag is set to 1, the auto-pop-up flag is set to 0 and control returns to the main process. Thereafter, the flashlight prohibition flag remains at 1 while the photometering switch SWS is held ON until the photometering timer, which is started at step S51, has elapsed. Thereafter, if control enters the built-in flash pop-up process at step S65 in the main process shown in FIG. 5B, at step S203 control comes out of the built-in flash pop-up process to return to the main process. According to this control, even if the auto-flashlight permission flag is set to 1 and at the same time the photometering switch SWS is turned ON, the built-in flash 111 is not automatically popped up. After the photometering timer has elapsed, the flashlight prohibition flag is set to 0 at step S89 in the main process shown in FIG. 5B. Therefore, if control enters the built-in flash pop-up process at step S65, the built-in flash 111 is automatically popped up on condition that the auto-flashlight permission flag is set to 1 while the photometering switch SWS is turned ON.

[AE Calculation Process]

Figure 9:
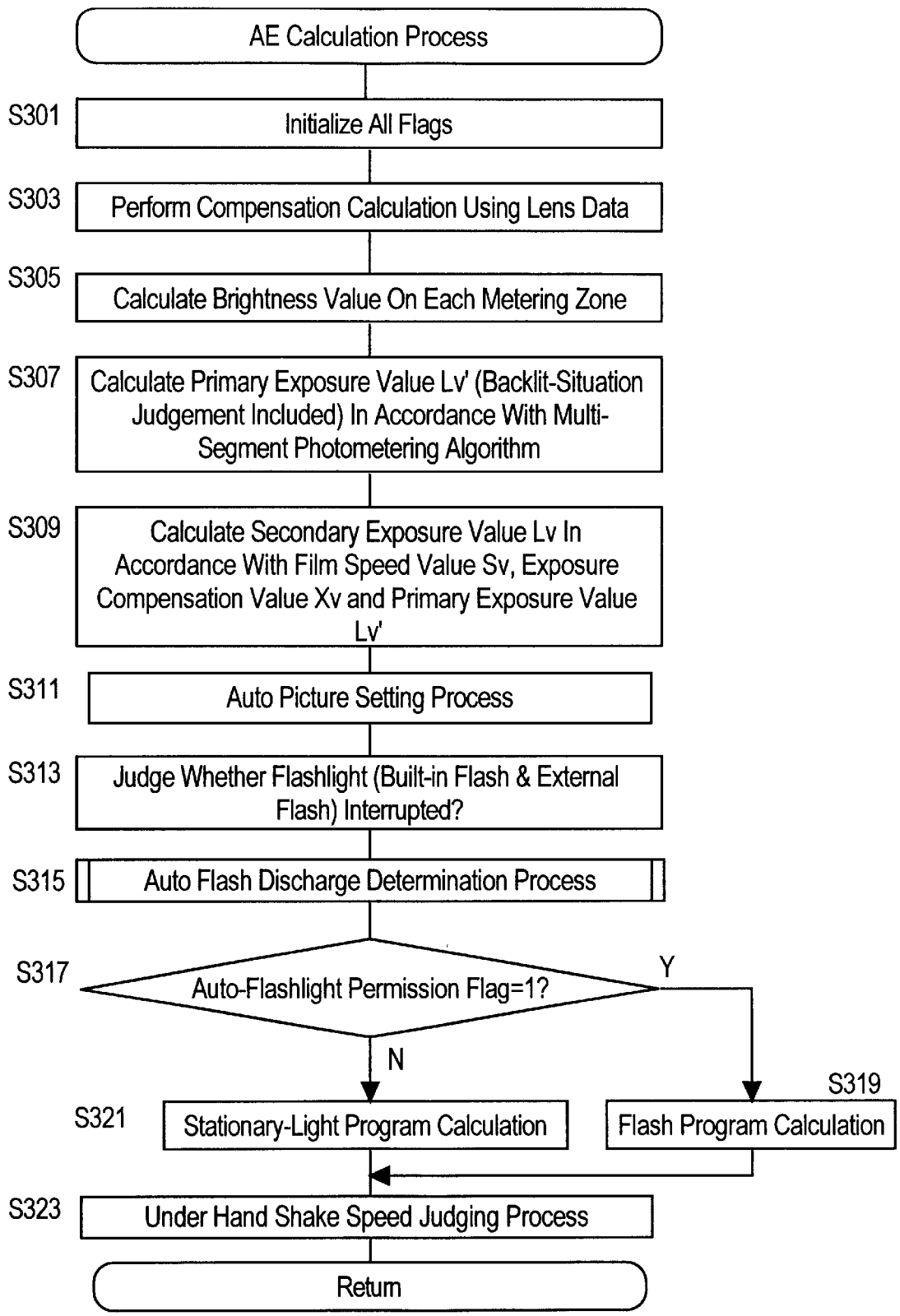
FIG. 9 is a flow chart of the subroutine "AE Calculation Process" shown in FIG. 5B.

The AE calculation process, which is performed at step S63 in the main process shown in FIG. 5B, will be hereinafter discussed in detail with reference to the flow chart shown in FIG. 9. In this process, firstly, all flags which are associated with the AE calculation process such as an under-hand-shake-speed flag are set to 0 (step S301). Subsequently, a predetermined compensation calculation is performed using the lens data such as the open aperture value and the minimum aperture value of the lens 61 which are input to the CPU 11 from the lens CPU 63 when the CPU 11 has data-communicated with the lens CPU 63 at step S57 (step S303). Subsequently, a brightness value is calculated on each photometering zone in accordance with the photometering signals input from the photometering IC 41 (step S305), and a primary exposure value Lv' is calculated in accordance with a multi-segment photometering algorithm (step S307). Thereafter, a secondary exposure value Lv which is used for the exposure control is calculated in accordance with a film speed value Sv, an exposure compensation value Xv and the primary exposure value Lv' (step S309).

Subsequently, an auto picture setting process ("Auto Picture Setting Process" described in FIG. 10) for setting an exposure mode selected by an operation of the mode dial 121 is performed (step S311). Details of the auto picture setting process will be discussed later.-Subsequently, the length of interruption "K" on the built-in flash 111 is calculated in accordance with the lens data input from the lens CPU 63 of the attached lens 61 and the built-in flash data input from the EEPROM 39, while the length of interruption "K" on the external flash 71 is calculated in accordance with the lens data input from the lens CPU 63 of the attached lens 61 and the external flash data input from the ROM (memory) 72 of the external flash 71 if the external flash 71 is attached to the camera body 101. Subsequently, it is judged whether the flashlight emitted from the built-flash 111 will be interrupted by the periphery of the attached lens 61 in accordance with the calculated length of interruption "K" on the built-in flash 111, while it is judged whether the flashlight emitted from the external flash 71 will be interrupted by the periphery of the attached lens 61 in accordance with the calculated length of interruption "K" on the external flash 71 if the external flash 71 is attached to the camera body 101. "Flashlight interruption" herein means that the flashlight emitted from the built-in flash 111 or the external flash 71 is interrupted by the periphery of the attached lens 61, as discussed above with reference to FIG. 4. Accordingly, the flashlight does not cover center lower part of the object area, so that the center lower part appears dark. In the present embodiment, in order to prevent such a problem from occurring, if it is judged at step S313 that flashlight emitted from the built-in flash 111 and/or the external flash 71 will be interrupted by the periphery of the attached lens 61, this judgement is stored in the internal RAM of the CPU 11 so that the built-in flash 111 or the external flash 71 does not discharge in an auto flash discharge determination process performed at step S315.

The auto flash discharge determination process ("Auto Flash Discharge Determination Process" described in FIGS. 10A and 10B) is performed at step S315. If the auto-flashlight permission flag is set to 1 in the auto flash discharge determination process, the CPU 11 judges whether the built-in flash 111 or the external flash 71 should discharge in accordance with predetermined conditions in a program calculation process. Details of the auto flash discharge determination process will be discussed later. If the CPU 11 judges that the built-in flash 111 or the external flash 71 should discharge, the built-in flash 111 or the external flash 71 discharges in a shutter release process ("Shutter Release Process" described in FIG. 11) at step S95.

After the auto flash discharge determination process is performed, it is determined at step S317 whether the auto-flashlight permission flag is 1. If the auto-flashlight permission flag is 1, a flash program calculation used on a flashlight-permission condition is performed to calculate the optimum shutter speed and the optimum aperture value (step S319). If the auto-flashlight permission flag is not 1, a stationary-light program calculation used on a flashlight-prohibition condition is performed to calculate the optimum shutter speed and the optimum aperture value (step S321). After the operation at step S319 or S321 is performed, an under hand-shake speed judging process is performed (step S323).

In the under hand-shake speed judging process it is determined whether the shutter speed calculated in the stationary-light program calculation at step S321 or the flash program calculation at step S319 is slower than the slowest shutter speed calculated to prevent blurred images due to hand movement. If the shutter speed calculated in the stationary-light program calculation at step S321 or the flash program calculation at step S319 is slower than the slowest shutter speed, the red LED 47b is turned ON in the finder LCD backlight lighting process at step S73 to illuminate the finder LCD 45 by red light so as to warn the user that a desired image will not be obtained.

[Auto Flash Discharge Determination Process]

Figure 10A:
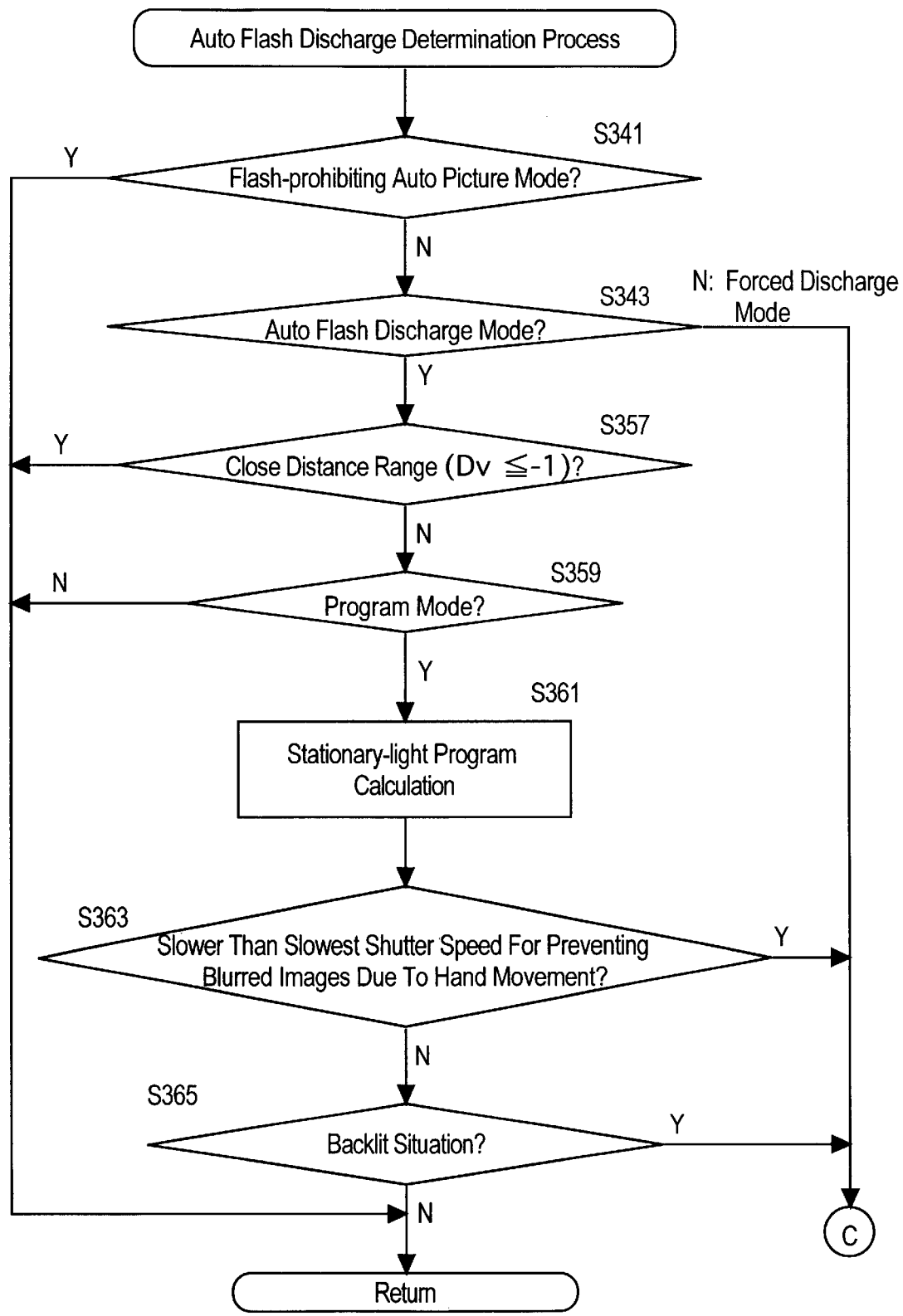
FIGS. 10A and 10B is a flow chart of "Auto Flash Discharge Determination Process" shown in FIG. 9.
Figure 10B:
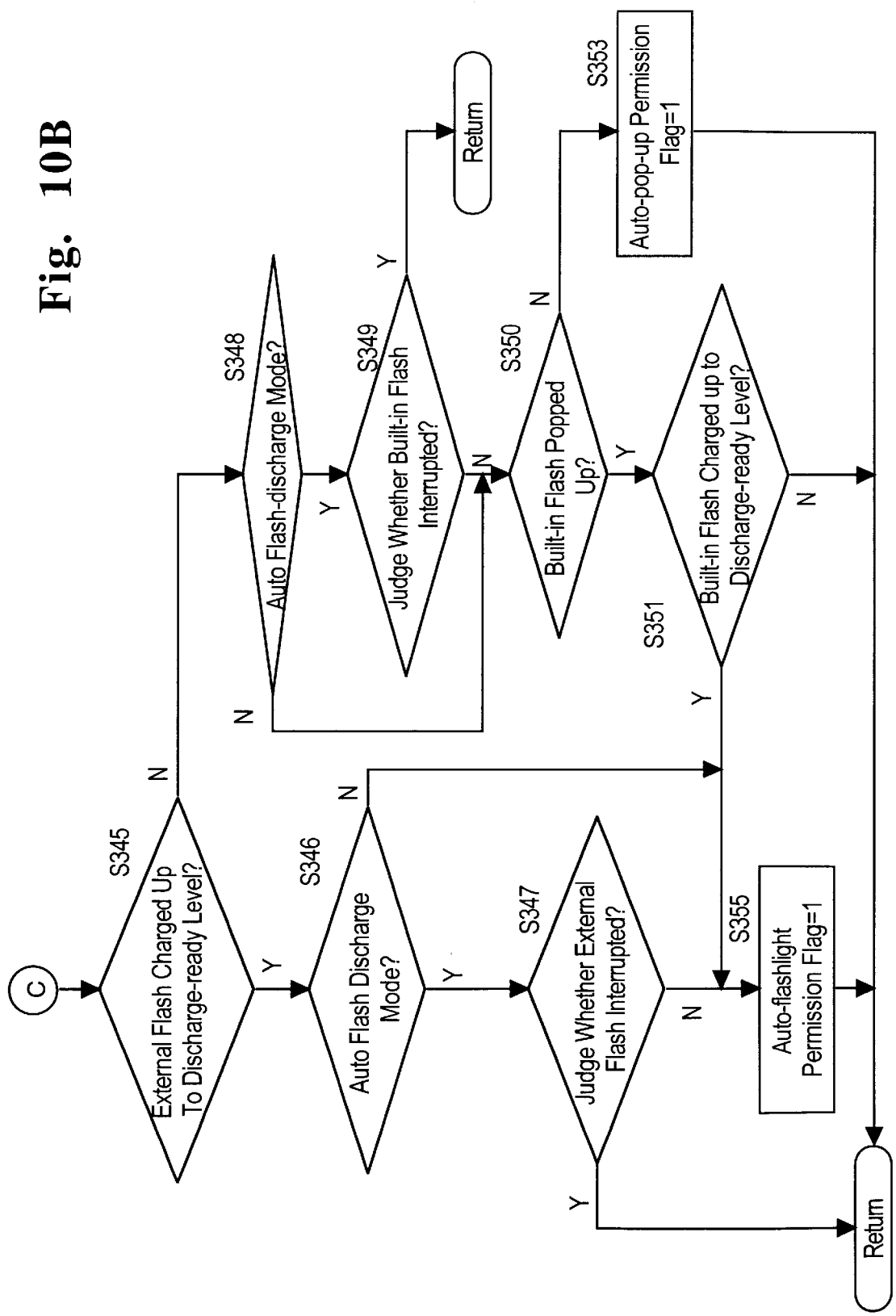

The auto flash discharge determination process, which is performed at step S315 in the AE calculation process described in FIG. 9, will be hereinafter discussed in detail with reference to the flow chart shown in FIGS. 10A and 10B. In this process, firstly, it is determined whether the flash-prohibiting auto picture mode has been selected by checking the state of the mode dial switch SWMod (step S341). If the flash-prohibiting auto picture mode has been selected, it means that the built-in flash 111 and the external flash 71 are prohibited from discharging, so that control returns to the AE calculation process. If a mode other than the flash-prohibiting auto picture mode has been selected, it is determined whether an auto flash discharge mode has been selected (step S343).

If it is determined at step S343 that the auto flash discharge mode has been selected, it is determined whether the object distance, which is obtained in the data-communication of the CPU 11 with the lens CPU 63, is equal to or shorter than a predetermined distance, namely, within a close distance range (step S357). If it is determined at step S357 that the object distance is within the close distance range, control returns to the AE calculation process. In the case where the object distance is too short, the automatic flashlight control does not work effectively. This may result in an over-exposure. In the present embodiment, if the distance value Dv is equal to or less than −1 (approximately 70 cm), the CPU 11 judges that the object distance is within the close distance range, so that in this case the CPU 11 controls each of the built-in flash 111 and the external flash 71 not to automatically discharge.

If it is determined at step S357 that the object distance, which is obtained in the data-communication of the CPU 11 with the lens CPU 63, is not equal to or less than the predetermined distance (i.e., the object distance is longer than the predetermined distance), it is determined whether one of the eight program modes (the flash-prohibiting auto picture mode, the night portrait mode, the sports action mode, the close-up mode, the landscape mode, the portrait mode, the standard mode, and the auto picture mode) has been selected (step S359). If it is determined at step S359 that a mode other than the eight program modes has been selected (i.e., one of the manual exposure mode, a shutter-priority AE mode or the program AE mode has been selected), whether the built-in flash 111 or the external flash 71 should be used or not depends on the user, so that control returns to the AE calculation process.

If it is determined at step S359 that one of the eight program modes has been selected, a stationary-light program calculation is performed to calculate the optimum shutter speed and the optimum aperture value (step S361). Subsequently, it is determined whether the shutter speed calculated in the stationary-light program calculation at step S361 is slower than the slowest shutter speed calculated to prevent blurred images which may be caused by hand movement (step S363). Subsequently, it is determined whether an object to be photographed is in a backlit situation in accordance with the object brightness data obtained from the photometering IC 41 (step S365). If it is determined at step S363 that the calculated shutter speed is not slower than the required slowest shutter speed, and if it is determined at step S365 that the object to be photographed is not in a backlit situation, control returns to the AE calculation process. If it is determined at step S363 that the calculated shutter speed is slower than the required slowest shutter speed or if it is determined at step S365 that the object to be photographed is in a backlit situation, control proceeds to step S345 so as to make the built-in flash 111 or the external flash 71 to discharge automatically. Note that "the slowest shutter speed calculated to prevent blurred images due to hand movement" herein refers to a shutter speed at which a picture with substantially no blurred images will be able to be taken even if there is a slight hand movement at a time of exposure. Therefore, if a picture is taken at a shutter speed which is faster than the calculated slowest shutter speed, a sharp exposure image can be normally obtained.

If it is determined at step S343 that the auto flash discharge mode is not selected, it means that a forced discharge mode has been selected, so that control proceeds to step S345 at which it is determined whether the external flash 71 has been charged up to a discharge-ready level thereof.

If it is determined at step S345 that the external flash 71 has been charged to the discharge-ready level, it is determined whether the auto flash discharge mode has been selected (step S346). If the auto flash discharge mode has been selected, it is determined whether, at step S313, the flashlight emitted from the external flash 71 attached to the hot shoe 113 was judged as being interrupted by the periphery of the attached lens 61 (step S347). If such judgement was made at step S347, the external flash 71 is not permitted to discharge, and control returns to the AE calculation process. Otherwise, the auto-flashlight permission flag, which indicates whether the built-in flash 111 is permitted from discharging automatically, is set to 1 (step S355) and control returns to the AE calculation process. If it is determined at step S346 that the auto flash discharge mode is not selected, the auto-flashlight permission flag is set to 1 (step S355) and control returns to the AE calculation process.

If it is determined at step S345 that the external flash 71 has not yet been charged to the discharge-ready level (this is also true to the case where the external flash 71 is not attached to the hot shoe 113), it is determined whether the auto flash discharge mode has been selected (step S348). If the auto flash discharge mode has been selected, it is determined whether it was judged at step S313 that the flashlight emitted from the built-in flash 111 will be interrupted by the periphery of the attached lens 61 (step S349). If such a judgement was made, the built-in flash 111 is not permitted to discharge, and control returns to the AE calculation process. Otherwise, it is determined whether the built-in flash 111 has popped up by checking the ON/OFF state of the pop-up state detection switch SWPud (step S350). Likewise, if it is determined at step S348 that the auto flash discharge mode is not selected, it is determined whether the built-in flash 111 has popped up by checking the ON/OFF state of the pop-up state detection switch SWPud (step S350).

If it is determined at step S350 that the built-in flash 111 has popped up, it is determined whether the built-in flash 111 has been charged up to a discharge-ready level thereof (step S351). If the built-in flash 111 has been charged up to the discharge-ready level, the auto-flashlight permission flag is set to 1 (step S355) and control returns to the AE calculation process. If it is determined at step S351 that the built-in flash 111 has not been yet charged up to the discharge-ready level, control returns to the AE calculation process.

If it is determined at step S350 that the built-in flash 111 has not popped up, it means that the built-in flash 111 is retracted or currently on the way to the fully-popped up position and therefore is not properly directed forwardly, so that the auto-pop-up permission flag is set to 1 (step S353) and subsequently control returns to the AE calculation process.

If the auto-pop-up permission flag is set at 1, in the built-in flash auto pop-up process control proceeds from step S243 to step S245 on condition that the photometering switch SWS is ON, so that the built-in flash 111 pops up automatically.

Figure 10C:
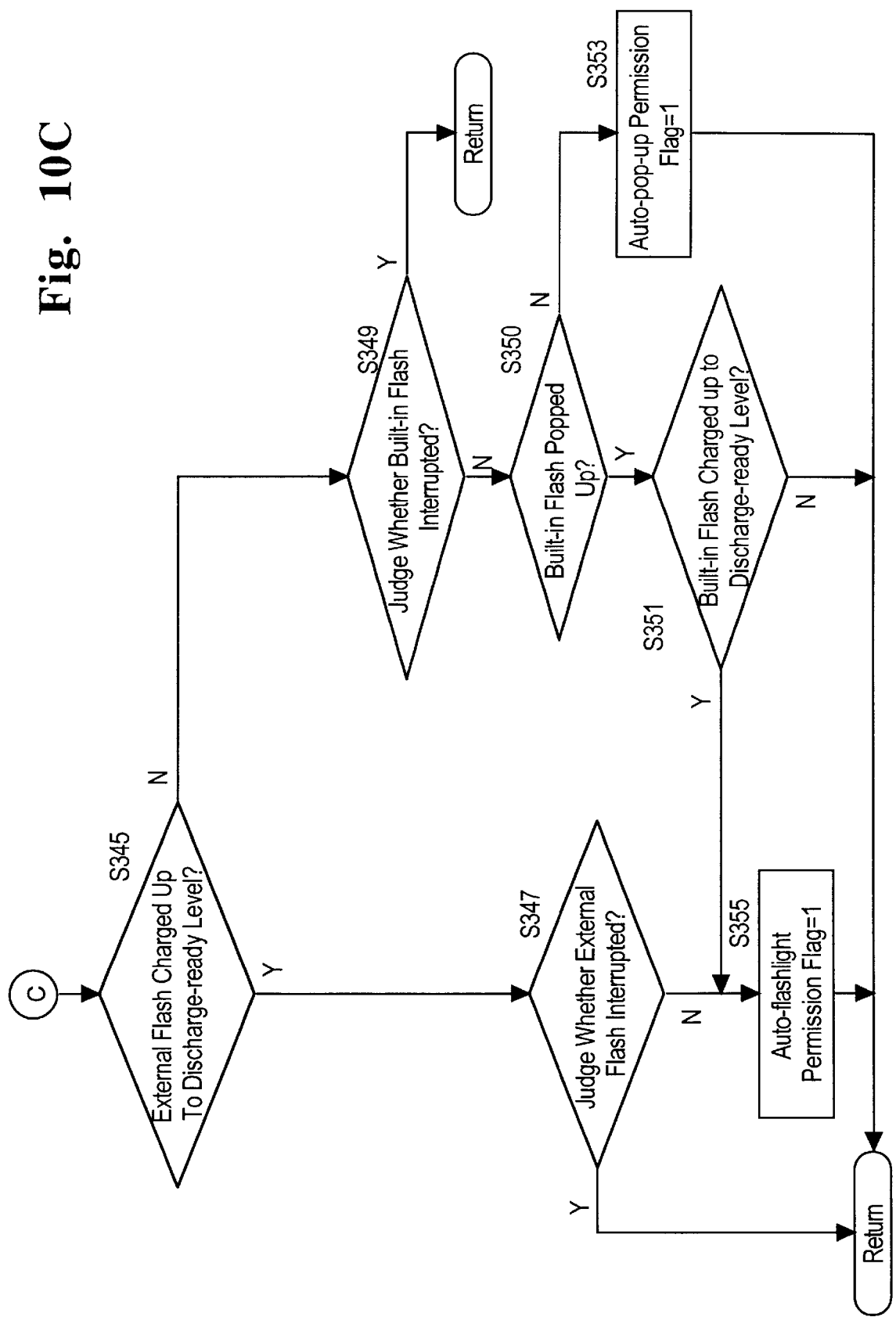
FIG. 10C is a flow chart of "Auto Flash Discharge Determination Process" shown in FIG. 9, as an alternative to FIG. 10B.

In the above-described embodiment, when the camera is in a forced flash discharge mode, i.e., when the camera is not in an auto flash discharge mode, since it is not determined whether the flashlight of the external flash 71 or the built-in flash 111 is obstructed, if the camera is not in an auto flash discharge mode, the flash is emitted even if the flash light is obstructed. Accordingly, FIG. 10C shows an embodiment for the case where the camera is in an auto flash discharge mode wherein the flashlight of the external flash 71 or the built-in flash 111 is obstructed, so that control does not permit the external flash unit 71 or the built-in flash 111 to emit flashlight. The flow chart of FIG. 10C does not have steps S346 and S349 of FIG. 10B. However, the remaining processes in FIG. 10C which are the same as FIG. 10B are designated with the same step numbers. According to the embodiment of FIG. 10C, even if the camera is not in an auto flash discharge mode, whether or not the flashlight is obstructed can be determined at steps S347 and S349. Accordingly, since if the flashlight is obstructed, control returns, since the auto-flashlight permission flag is not set to 1, the external flash 71 is not emitted, and since the auto-pop-up-permission flag is not set to 1, the built-in flash does not pop up.

[Shutter Release Process]

Figure 11:
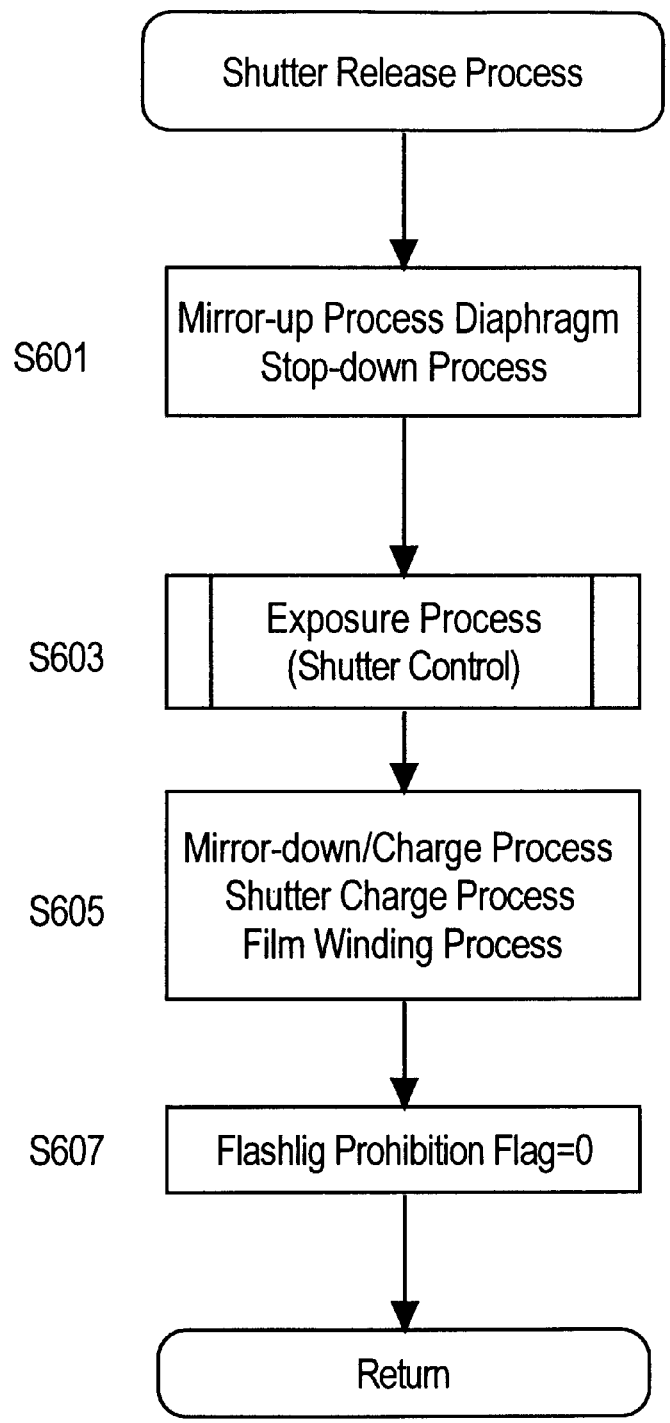
FIG. 11 is a flow chart of the subroutine "Shutter Release Process" shown in FIG. 5B.

The shutter release process, which is performed at step S95 in the main process shown in FIG. 5B, will be hereinafter discussed in detail with reference to the flow chart shown in FIG. 11. In this process, firstly a mirror-engagement release magnet (not shown) is supplied with current to release the engagement of an engaging member with the quick-return mirror 160 so that the quick-return mirror 160 rises by a spring force of a spring (not shown) and at the same time the diaphragm control circuit 37 is controlled to stop down the iris diaphragm of the interchangeable lens 61 by an amount corresponding to the aperture value determined by the AE calculation process (step S601). Immediately after it is detected with a mirror-up detection switch (not shown) that the quick-return mirror 160 has completely risen, the shutter circuit 35 starts operating to perform an exposure process ("Exposure Process" described in FIG. 12) in which the shutter circuit 35 is controlled to release the focal plane shutter in accordance with the determined shutter speed (step S603). The details of the exposure process will be discussed later. Subsequently, upon the completion of the operation of the focal plane shutter, a mirror-down/charge process, a shutter charge process and a film winding process are performed (step S605). In the mirror-down/charge process, the charge motor 21 is driven to make the quick-return mirror 160 swing down while the drive springs of the leading and trailing curtains of the shutter mechanism are charged. In the shutter charge process, the leading and trailing curtains are moved back to the initial positioned thereof while a shutter charging spring is charged. In the film winding process, the film motor 25 is driven to wind film by one frame. Subsequently the flashlight prohibition flag is set to 0 (step S607) and control returns to the main process.

[Exposure Process]

Figure 12:
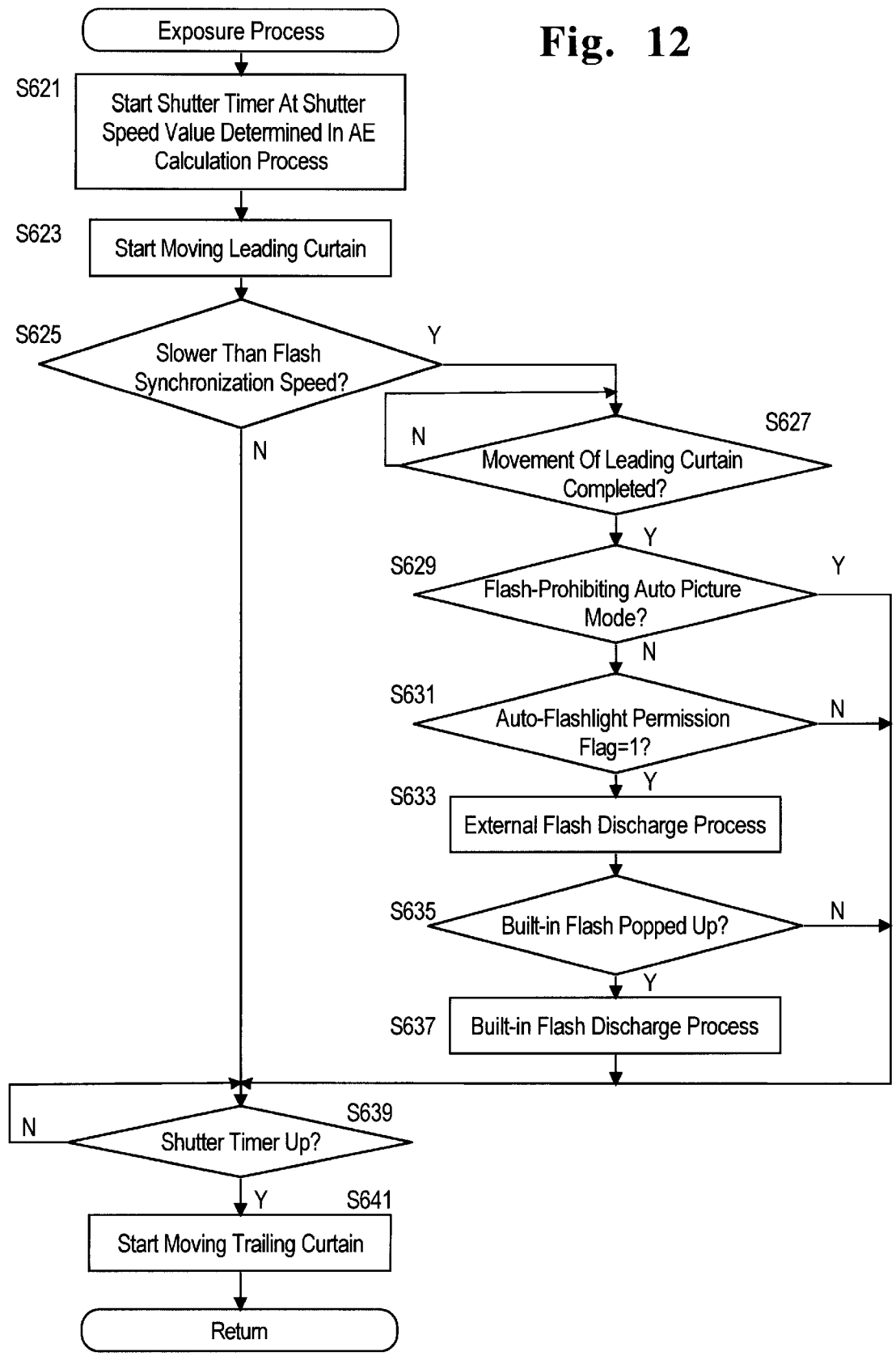
FIG. 12 is a flow chart of the subroutine "Exposure Process" shown in FIG. 11.

The exposure process, which is performed at step S603 in the shutter release process described in FIG. 11, will be hereinafter discussed in detail with reference to the flow chart shown in FIG. 12. In this process, firstly the time value of a shutter timer is set to the value of the shutter speed (exposure) determined in the AE calculation process, and subsequently the shutter timer is started (step S621). Subsequently the leading curtain of the focal plane shutter is released to start moving (step S623). It is next determined whether the shutter speed determined in the AE calculation process is equal to or slower than the flash synchronization speed (step S625). If the shutter speed is faster than the flash synchronization speed, neither the built-in flash 111 nor the external flash 71 should discharge. Accordingly, after the operation at step S625, control proceeds to step S639 at which it is determined whether the shutter timer has elapsed. If the counting of the shutter timer is up, the trailing curtain of the focal plane shutter is released to start moving (step S641) and subsequently control returns to the shutter release process.

If it is determined at step S625 that the shutter speed is equal to or slower than the flash synchronization speed, it is determined whether the movement of the leading curtain has not yet completed (step S627). If the movement of the leading curtain has completed, control repeats the checking operation at step S627. Thereafter, if the movement of the leading curtain has completed, it is determined whether the flash-prohibiting auto picture mode has been selected (step S629). If the flash-prohibiting auto picture mode has been selected, neither the built-in flash 111 nor the external flash 71 should discharge. Accordingly, control proceeds to step S639. If the flash-prohibiting auto picture mode has not been selected, it is determined whether the auto-flashlight permission flag is 1, i.e., whether the built-in flash 111 or the external flash 71 can discharge (step S631). If the auto-flashlight permission flag is not 1, i.e., the built-in flash 11 or the external flash 71 cannot discharge, control proceeds to step S639. If it is determined at step S631 that the auto-flashlight permission flag is 1, control proceeds to step S633 at which an external flash discharge process is performed. In this process, a command signal (discharging signal) is sent to the external flash 71 to make it discharge in the case where the external flash 71 is attached to the hot shoe 113.

Subsequently, it is determined whether the built-in flash 111 has risen to the discharge position by determining if the pop-up state detection switch SWPud is turned ON (step S635). If the built-in flash 111 has risen to the discharge position, control proceeds to step S637 at which a built-in flash discharge process is performed to make the built-in flash 111 discharge. In the case where the external flash 71 is attached to the hot shoe 113, the built-in flash 111 is prohibited from popping up, so that at step S635 control proceeds to step S639.

In the external flash discharge process at step S633 and the built-in flash discharge process at step S637, normally, exposure from image light passing through the lens is measured by a suitable light-sensitive mechanism of a TTL photometering system (not shown). Subsequently, if the value of the exposure reaches the calculated exposure value, a command signal (discharge stop signal) is sent to the built-in flash 111 or the external flash 71 to stop discharging.

Although the present invention is applied to the illustrated embodiment of the camera system whose camera body is provided with the built-in flash 111, the present invention can also be applied to any other camera system whose camera body is not provided with a built-in flash, but only a hot shoe or the like to which an external flash is attached. In other words, it has only to be able to be judged whether the flashlight emitted from the flash will be interrupted by the periphery of the attached interchangeable lens 61.

As can be understood from the foregoing, according to a flash controller of a camera to which the present invention is applied, it can be judged whether the flashlight emitted from the built-in flash, or the external flash, will be interrupted by the periphery of the attached interchangeable lens in accordance with the input lens information and the built-in flash data or the external flash data input from the external flash. Accordingly, if it is judged that the flashlight will be interrupted by the periphery of the attached interchangeable lens, the flashlight can be prevented from casting a shadow of the attached interchangeable lens on center lower part of the object area by prohibiting the built-in flash from discharging at a time of exposure, which reduces the number of undesired exposures.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A flash controller of a camera system comprising a camera body and an interchangeable lens which is detachably attached to said camera body, said camera body comprising a built-in flash, said interchangeable lens being configured for data communication with said camera body, such that lens data on said interchangeable lens, comprising data relating to at least one characteristic of an object being photographed, is output to said camera body, said flash controller comprising:

a memory, provided in said camera body, that stores predetermined flash data on said built-in flash; and a calculating device, provided in said camera body, that calculates a flash interruption value based on at least said lens data input from said interchangeable lens and said flash data input from said memory, said flash interruption value representing a quantity of light emitted from said built-in flash that is interrupted by a periphery of said interchangeable lens, said calculating device subsequently judging whether flashlight emitted from said built-in flash will be interrupted by said periphery of said interchangeable lens in accordance with said flash interruption value.

2. The flash controller according to claim 1, further comprising an auto-flash prohibiting device which prohibits said flash from automatically discharging if said calculating device judges that said flashlight will be interrupted by said periphery of said interchangeable lens.

3. The flash controller according to claim 1, wherein said camera body comprises a multi-segment photometering device for determining whether an object to be photographed is in a backlit situation, said camera body providing an auto flash discharge mode, wherein said flash can discharge automatically at a time of exposure in said backlit condition; and wherein said calculating device judges whether said flashlight will be interrupted by said periphery of said interchangeable lens on condition that an object distance is longer than a predetermined distance and that a selected shutter speed is slower than a slowest shutter speed calculated to prevent blurred images which may be caused by hand movement of said camera body.

4. The flash controller according to claim 3, wherein said object distance is obtained via said data communication.

5. The flash controller according to claim 3, wherein said flash controller prohibits said flash from discharging in the case where said calculating device judges that one of an object distance is shorter than said predetermined distance and that said selected shutter speed is faster than said slowest shutter speed.

6. The flash controller according to claim 1, said lens data, input from said interchangeable lens, comprising a distance to the object to be photographed and a height of the object to be photographed.

7. The flash controller according to claim 1, said calculating device calculating said flash interruption value as follows:

$$K=HH+FU1(HL-HS\pm FL)(TL-DS);$$

wherein,

K is said flash interruption value;
HH is a height of the object to be photographed;
FU1 is a distance from a front end of said interchangeable lens to the object to be photographed;
HL is a radius of the front end of said interchangeable lens;
HS is a height of said built-in flash;
FL is a radius of a Fresnal lens of said built-in flash;
TL is a total length from a film plane of said camera body to the front end of said interchangeable lens; and
DS is a position of said built-in flash, the position comprising a horizontal length from a center of the film plane to a center of the Fresnal lens.

8. A flash controller of a camera body to which an interchangeable lens is detachably attached, said camera body comprising a built-in flash, said interchangeable lens being configured for data communication with said camera body, such that lens data on said interchangeable lens, comprising data relating to at least one characteristic of an object being photographed, is output to said camera body, said flash controller comprising:

a memory that stores predetermined flash data on said built-in flash; and a calculating device that calculates a flash interruption value based on at least said lens data input from said interchangeable lens and said flash data input from said memory, said flash interruption value representing a quantity of light emitted from said built-in flash that is interrupted by a periphery of said interchangeable lens, said calculating device subsequently judging whether flashlight emitted from said built-in flash will be interrupted by said periphery of said interchangeable lens in accordance with said flash interruption value.

9. The flash controller according to claim 8, further comprising an auto-flash prohibiting device which prohibits said flash from automatically discharging if said calculating device judges that said flashlight will be interrupted by said periphery of said interchangeable lens.

10. The flash controller according to claim 8, said lens data, input from said interchangeable lens, comprising a distance to the object to be photographed and a height of the object to be photographed.

11. The flash controller according to claim 8, said calculating device calculating said flash interruption value as follows:

$$K=HH+FU1(HL-HS\pm FL)(TL-DS);$$

wherein,

K is said flash interruption value;
HH is a height of the object to be photographed;
FU1 is a distance from a front end of said interchangeable lens to the object to be photographed;
HL is a radius of the front end of said interchangeable lens;
HS is a height of said built-in flash;
FL is a radius of a Fresnal lens of said built-in flash;
TL is a total length from a film plane of said camera body to the front end of said interchangeable lens; and
DS is a position of said built-in flash, the position comprising a horizontal length from a center of the film plane to a center of the Fresnal lens.

12. A flash controller of a camera system comprising a camera body, an interchangeable lens which is detachably attached to said camera body, and an external flash which is detachably attached to said camera body, said interchangeable lens being configured for data communication with said camera body, such that lens data on said interchangeable lens, comprising data relating to at least one characteristic of an object being photographed, is output to said camera body, said external flash being configured for data communication with said camera body, such that flash data on said external flash is output to said camera body, said flash controller comprising:

a calculating device, provided in said camera body, that calculates a flash interruption value based on at least said lens data input from said interchangeable lens and said flash data input from said external flash, said flash interruption value representing a quantity of light emitted from said external flash that is interrupted by a periphery of said interchangeable lens, said calculating device subsequently judging whether flashlight emitted from said external flash will be interrupted by a periphery of said interchangeable lens in accordance with said flash interruption value.

13. The flash controller according to claim 12, further comprising an auto-flash prohibiting device which prohibits said flash from automatically discharging if said calculating device judges that said flashlight will be interrupted by said periphery of said interchangeable lens.

14. The flash controller according to claim 12, wherein said camera body comprises a multi-segment photometering device for determining whether an object to be photographed is in a backlit situation, said camera body providing an auto flash discharge, wherein said flash can discharge automatically at a time of exposure in said backlit condition; and wherein said calculating device judges whether said flashlight will be interrupted by said periphery of said interchangeable lens on condition that an object distance is longer than a predetermined distance and that a selected shutter speed is slower than a slowest shutter speed calculated to prevent blurred images which may be caused by hand movement of said camera body.

15. The flash controller according to claim 14, wherein said object distance is obtained via said data communication.

16. The flash controller according to claim 14, wherein said flash controller prohibits said flash from discharging in the case where said calculating device judges that one of an object distance is shorter than said predetermined distance and that said selected shutter speed is faster than said slowest shutter speed.

17. The flash controller according to claim 12, said lens data, input from said interchangeable lens, comprising a distance to the object to be photographed and a height of the object to be photographed.

18. The flash controller according to claim 12, said calculating device calculating said flash interruption value as follows:

$$K=HH+FU1(HL-HS\pm FL)(TL-DS);$$

wherein,

K is said flash interruption value;

HH is a height of the object to be photographed;

FU1 is a distance from a front end of said interchangeable lens to the object to be photographed;

HL is a radius of the front end of said interchangeable lens;

HS is a height of said external flash;

FL is a radius of a Fresnal lens of said external flash;

TL is a total length from a film plane of said camera body to the front end of said interchangeable lens; and DS is a position of said external flash, the position comprising a horizontal length from a center of the film plane to a center of the Fresnal lens.

19. A flash controller of a camera body to which each of an interchangeable lens and an external flash is detachably attached, said interchangeable lens being configured for data communication with said camera body, such that lens data on said interchangeable lens, comprising data relating to at least one characteristic of an object being photographed, is output to said camera body, said external flash being configured for data communication with said camera body, such that flash data on said external flash is output to said camera body, said flash controller comprising:

a calculating device that calculates a flash interruption value based on at least said lens data input from said interchangeable lens and said flash data input from said external flash, said flash interruption value representing a quantity of light emitted from said external flash that is interrupted by a periphery of said interchangeable lens, said calculating device subsequently judging whether flashlight emitted from said external flash will be interrupted by a periphery of said interchangeable lens in accordance with said flash interruption value.

20. The flash controller according to claim 13, further comprising an auto-flash prohibiting device which prohibits said flash from automatically discharging if said calculating device judges that said flashlight will be interrupted by said periphery of said interchangeable lens.

21. The flash controller according to claim 19, said lens data, input from said interchangeable lens, comprising a distance to the object to be photographed and a height of the object to be photographed.

22. The flash controller according to claim 19, said calculating device calculating said flash interruption value as follows:

$$K=HH+FU1(HL-HS\pm FL)(TL-DS);$$

wherein,

K is said flash interruption value;

HH is a height of the object to be photographed;

FU1 is a distance from a front end of said interchangeable lens to the object to be photographed;

HL is a radius of the front end of said interchangeable lens;

HS is a height of said external flash;

FL is a radius of a Fresnal lens of said external flash;

TL is a total length from a film plane of said camera body to the front end of said interchangeable lens; and DS is a position of said external flash, the position comprising a horizontal length from a center of the film plane to a center of the Fresnal lens.

23. A flash controller of a camera system comprising a camera body and an interchangeable lens which is detachably attached to said camera body, said camera body comprising a built-in flash, said interchangeable lens being configured for data communication with said camera body, such that lens data on said interchangeable lens, comprising data relating to at least one characteristic of an object being photographed, is output to said camera body, said camera body being configured to interconnect with an external flash capable of having data communication with said camera body, such that external flash data on said external flash is output to said camera body, said flash controller comprising:

a memory, provided in said camera body, that stores predetermined built-in flash data on said built-in flash; and a calculating device, provided in said camera body, that calculates a flash interruption value based on at least said lens data input from said interchangeable lens and said built-in flash data input from said memory when said camera body is used with said built-in flash, and that calculates the flash interruption value based on at least said lens data input from said interchangeable lens and said external flash data input from said external flash when said camera body is used with said external flash, said flash interruption value representing a quantity of light emitted from one of said built-in flash and said external flash that is interrupted by a periphery of said interchangeable lens;

said calculating device subsequently judging whether flashlight emitted from the one of said built-in flash and said external flash will be interrupted by said periphery of said interchangeable lens in accordance with said flash interruption value.

24. The flash controller according to claim 23, further comprising an auto-flash prohibiting device which prohibits said flash from automatically discharging if said calculating device judges that said flashlight will be interrupted by said periphery of said interchangeable lens.

25. The flash controller according to claim 24, wherein said auto-flash prohibiting device is provided in said camera body.

26. The flash controller according to claim 23, further comprising a forced flash discharge device;
   wherein in the case where a forced discharge mode is selected when said calculating device judges that said flashlight will not be interrupted by said periphery of said interchangeable lens, said forced flash discharge device forcibly activates said flash to discharge at a time of exposure; and
   wherein in the case where said forced discharge mode is selected when said calculating device judges that said flashlight will be interrupted by said periphery of said interchangeable lens, said auto-flash prohibiting device prohibits said flash from discharging.

27. The flash controller according to claim 23, said lens data, input from said interchangeable lens, comprising a distance to the object to be photographed and a height of the object to be photographed.

28. The flash controller according to claim 23, said calculating device calculating said flash interruption value as follows:

$$K=HH+FU1(HL-HS\pm FL)(TL-DS);$$

wherein,

K is said flash interruption value;

HH is a height of the object to be photographed;

FU1 is a distance from a front end of said interchangeable lens to the object to be photographed;

HL is a radius of the front end of said interchangeable lens;

HS is a height of one of said built-in flash and said external flash;

FL is a radius of a Fresnal lens of one of said built-in flash and said external flash;

TL is a total length from a film plane of said camera body to the front end of said interchangeable lens; and DS is a position of one of said built-in flash and said external flash, the position comprising a horizontal length from a center of the film plane to a center of the Fresnal lens.

* * * * *